United States Patent
Hu et al.

(10) Patent No.: US 12,519,528 B2
(45) Date of Patent: Jan. 6, 2026

(54) BEAM MANAGEMENT METHOD AND APPARATUS

(71) Applicant: HUAWEI TECHNOLOGIES CO., LTD., Guangdong (CN)

(72) Inventors: Bin Hu, Shenzhen (CN); Jian Wang, Hangzhou (CN); Chuili Kong, Hangzhou (CN); Rong Li, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 360 days.

(21) Appl. No.: 18/360,842

(22) Filed: Jul. 28, 2023

(65) Prior Publication Data

US 2023/0370148 A1    Nov. 16, 2023

Related U.S. Application Data

(63) Continuation of application No. PCT/CN2021/141786, filed on Dec. 27, 2021.

(30) Foreign Application Priority Data

Feb. 10, 2021 (CN) .......................... 202110185579.3

(51) Int. Cl.
*H04B 7/06* (2006.01)

(52) U.S. Cl.
CPC ....... *H04B 7/06952* (2023.05); *H04B 7/0632* (2013.01)

(58) Field of Classification Search
CPC .............. H04B 7/06952; H04B 7/0632; H04B 7/0619; H04B 7/0413; H04B 7/0617; H04W 16/28
See application file for complete search history.

(56) References Cited

U.S. PATENT DOCUMENTS

| | | | |
|---|---|---|---|
| 9,225,401 B2 | 12/2015 | Wang | |
| 2016/0099763 A1 | 4/2016 | Chen | |

(Continued)

FOREIGN PATENT DOCUMENTS

| | | | |
|---|---|---|---|
| CN | 103378892 A | 10/2013 | |
| CN | 109478925 A | 3/2019 | |
| WO | 2019210804 A1 | 11/2019 | |

OTHER PUBLICATIONS

IEEE Std 802.11ad-2012, IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 3: Enhancements for Very High Throughput in the 60 GHz Band, Approved Oct. 19, 2012, total 628 pages.

(Continued)

*Primary Examiner* — Tejis Daya

(57) ABSTRACT

This disclosure provides a beam management method and apparatus, to quickly implement beam alignment. The beam management method is applied to a first device and includes: obtaining a first reference signal sent by a second device based on a first set beam, and determining a first beam based thereon such that a signal quality of the first reference signal obtained by the first device based on the first beam is the best; and sending a second reference signal to the second device based on the first beam, where the second reference signal is used to determine a second beam of the second device, and a signal quality of the second reference signal obtained by the second device based on the second beam is the same as that of the first reference signal obtained by the first device based on the first beam.

20 Claims, 15 Drawing Sheets

(56) References Cited

U.S. PATENT DOCUMENTS

2019/0327060 A1* 10/2019 Liu .................. H04L 25/03
2020/0204222 A1    6/2020 Lou et al.
2020/0287604 A1*  9/2020 Gao .................. H04B 7/06966
2021/0234604 A1*  7/2021 Raghavan .......... H04B 7/0456

OTHER PUBLICATIONS

Wen Wu et al, Fast mmwave Beam Alignment via Correlated Bandit Learning, IEEE Transactions on Wireless Communications, vol. 18, No. 12, Dec. 2019, 15 pages.

P. Auer et al, Gambling in a rigged casino: The adversarial multi-armed bandit problem, Proceedings of IEEE 36th Annual Foundations of Computer Science, 1995, 10 pages.

* cited by examiner

Second candidate beam set

| Beam ID | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| SNR |  |  | R4 | R6' | R1 |  | R3 |  |  | R5' |  |  | R2 |  |  |  |

Fifth candidate beam set

| Beam ID | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| SNR |  |  |  | R1 | R6 | R4' | R5' |  |  | R3 |  | R2 |  |  |  |  |

BEAM MANAGEMENT METHOD AND APPARATUS

CROSS-REFERENCE TO RELATED APPLICATIONS

This application is a continuation of International Application No. PCT/CN2021/141786, filed on Dec. 27, 2021, which claims priority to Chinese Patent Application No. 202110185579.3, filed on Feb. 10, 2021. The disclosures of the aforementioned applications are hereby incorporated by reference in their entireties.

TECHNICAL FIELD

Embodiments of this application relate to the field of communication technologies, and in particular, to a beam management method and apparatus.

BACKGROUND

In a multiple-input multiple-output (multi input multi output, MIMO) communication system, a large number of antenna elements with controllable directions are supported at a transmit end and a receive end, and the transmit end and the receive end can transmit and receive signals through a plurality of antennas. In order to reduce impact of signal attenuation on signal power of a receive antenna, the number of transmit antennas and receive antennas is usually increased, that is, a multi-antenna array (Massive MIMO) is designed to generate high-gain, adjustable shaped beams to improve signal coverage. As more antennas are used, a width of a beam formed becomes narrower. In order to ensure normal communication between the transmit and receive ends, beam alignment becomes an important research item of beam management in MIMO.

SUMMARY

Embodiments of this application provide a beam management method and apparatus, to quickly implement beam alignment.

According to a first aspect, an embodiment of this application provides a beam management method applied to a first device. The method includes: obtaining a first reference signal from a second device, and determining a first beam, where the first reference signal is sent by the second device based on a first set beam, and a signal quality of the first reference signal obtained by the first device based on the first beam is the best; and sending a second reference signal to the second device based on the first beam, where the second reference signal is used to determine a second beam of the second device, and a signal quality of the second reference signal obtained by the second device based on the second beam is the same as that of the first reference signal obtained by the first device based on the first beam.

In this embodiment of this application, first, one end is set to send a beam, to train a best receive beam of the other end; and then a best receive beam of the foregoing one end is trained based on the foregoing best receive beam, so as to quickly achieve beam alignment between the two ends. By using uplink and downlink consistency, the first device and the second device can perform data transmission through a beam combination consisting of the first beam and the second beam.

In an optional implementation, before the obtaining a first reference signal from a second device, the method further includes: sending a third reference signal to the second device based on a wide beam of the first device, where the third reference signal is used to determine the first set beam of the second device, and a signal quality of the third reference signal obtained by the second device based on the first set beam is the best.

In this embodiment of this application, the first set beam is a best receive beam trained based on a transmit wide beam, and the use of the first set beam as a basis for training the first beam makes performance of training the first beam and the second beam better and further improves accuracy of beam alignment.

In an optional implementation, before the obtaining a first reference signal from a second device, the method further includes: sending a third reference signal to the second device based on a third beam of the first device, where the third reference signal is used to determine the first set beam of the second device, and a signal quality of the third reference signal obtained by the second device based on the first set beam is the best.

In this embodiment of this application, the first set beam is a best receive beam trained based on a transmit beam (namely, the third beam) specified by the first device. The use of the first set beam as a basis for training the first beam may be applicable to a scenario in which the first device requires beam alignment to be within a specific beam range.

In an optional implementation, before the obtaining a first reference signal from a second device, the method further includes: periodically obtaining a fourth reference signal from the second device, and determining a first candidate beam set, where the fourth reference signal is sent by the second device based on a first initialization beam of the second device, and an $i^{th}$ beam in the first candidate beam set is determined based on the fourth reference signal received for the $i^{th}$ time, i being a positive integer; the first candidate beam set includes the third beam, and a signal quality of the fourth reference signal obtained by the first device based on the third beam is the best.

In this embodiment of this application, the first set beam is a best receive beam trained based on the third beam of the first device, but the third beam is trained based on the first initialization beam selected by the second device. The use of the first set beam as a basis for training the first beam may be applicable to a scenario in which the second device requires beam alignment to be within a specific beam range.

In an optional implementation, before the obtaining a first reference signal from a second device, the method further includes: periodically obtaining a fourth reference signal from the second device, and determining a first candidate beam set, where the fourth reference signal is sent by the second device based on a wide beam of the second device, and an $i^{th}$ beam in the first candidate beam set is determined based on the fourth reference signal received for the $i^{th}$ time, i being a positive integer; the first candidate beam set includes a third beam, and a signal quality of the fourth reference signal obtained by the first device based on the third beam is the best.

In an optional implementation, the method further includes: when the fourth reference signal has been periodically obtained for a first duration, if beams that have been determined in the first candidate beam set do not include the third beam, sending first indication information to the second device, where the first indication information is used to indicate a remaining number of repetitions for the second device to send the fourth reference signal; or when the fourth reference signal has been periodically obtained for the first duration, if the beams that have been determined in the first candidate beam set include the third beam, feeding back to the second device the signal quality of the fourth reference signal obtained by the first device based on the third beam. The first device indicates the remaining number of transmissions of the reference signal to the second device based on the included beams in the process of constructing the candidate beam set and searching for beams, so that a number of reference signal transmissions by the second device can be reduced without searching for all the beams, that is, signaling overheads can be reduced, and a time for constructing the candidate beam set can be shortened, which helps to quickly achieve beam alignment.

In an optional implementation, the obtaining a first reference signal from a second device, and determining a first beam includes: obtaining the first reference signal from the second device based on the third beam; comparing a signal quality of the first reference signal obtained by the first device based on the third beam with that of the fourth reference signal obtained by the first device based on the third beam, to determine a first comparison result; sending second indication information to the second device based on the first comparison result, where the second indication information is used to indicate the second device to send the first reference signal p times, p being a positive integer; and receiving the first reference signal sent by the second device p times, updating the first candidate beam set to obtain a second candidate beam set, where the second candidate beam set includes the first beam, and the signal quality of the first reference signal obtained by the first device based on the first beam is greater than that of the first reference signal obtained by the first device based on the third beam. Updating and iterating the initially constructed candidate beam set is conducive to improving the accuracy and reliability of beam alignment.

In an optional implementation, the method further includes: obtaining a fifth reference signal sent by the second device based on a second set beam, and determining a fifth beam, where a signal quality of the fifth reference signal obtained by the first device based on the fifth beam is the best, and a signal quality of the first reference signal obtained by the first device based on the fifth beam is less than that of the first reference signal obtained by the first device based on the first beam; the second set beam is any beam of the second device other than the first beam. When the best beam combination is trained in multiple rounds based on different set beams, the best round is selected as a beam alignment training result (the first beam and the second beam), which is conducive to improving the accuracy and reliability of beam alignment.

In an optional implementation, the method further includes: obtaining a data signal from the second device based on the first beam, where the data signal is sent by the second device based on the second beam, and the data signal is associated with a sixth reference signal; and comparing a signal quality of the sixth reference signal obtained by the first device based on the first beam with that of the first reference signal obtained by the first device based on the first beam, to obtain a second comparison result, where the second comparison result is used to update a beam used by the first device to receive the data signal or a beam used by the second device to send the data signal. In a data transmission process, a beam used for receiving or sending data is updated in a timely manner with reference to a change of channel information, for example, a variation of a reference signal, to implement beam tracking. This is applicable to a scenario in which a device is moving, and can effectively ensure normal communication between devices.

In an optional implementation, beam tracking may be performed on the side of the first device. The method further includes: updating the second candidate beam set based on the second comparison result to obtain a third candidate beam set, where the third candidate beam set includes a sixth beam, and a signal quality of the data signal received by the first device through the sixth beam is greater than or equal to that of the data signal obtained by the first device through the first beam. The data signal from the second device is obtained based on the sixth beam. In another optional implementation, beam tracking may be performed on the side of the second device. The method further includes: feeding back the second comparison result to the second device, where the second comparison result is further used to determine q beams of the second device; obtaining, based on the first beam, a seventh reference signal sent by the second device based on the q beams, and determining a seventh beam, where a signal quality of the seventh reference signal that is sent by the second device based on the seventh beam and that is obtained by the first device is the best; and sending fourth indication information to the second device, where the fourth indication information indicates the second device to send the data signal based on the seventh beam.

According to a second aspect, an embodiment of this application provides a beam management method applied to a second device. The method includes: sending a first reference signal to a first device based on a first set beam, where the first reference signal is used to determine a first beam of the first device, and a signal quality of the first reference signal obtained by the first device based on the first beam is the best; and obtaining a second reference signal from the first device, and determining a second beam, where the second reference signal is sent by the first device based on the first beam, a signal quality of the second reference signal obtained by the second device based on the second beam is the same as that of the first reference signal obtained by the first device based on the first beam.

In this embodiment of this application, first, one end is set to send a beam, to train a best receive beam of the other end; and then a best receive beam of the foregoing one end is trained based on the foregoing best receive beam, so as to quickly achieve beam alignment between the two ends. By using uplink and downlink consistency, the first device and the second device can perform data transmission through a beam combination consisting of the first beam and the second beam.

In an optional implementation, before the sending a first reference signal to a second device based on a first set beam, the method further includes: obtaining a third reference signal from the first device, and determining the first set beam, where the third reference signal is sent by the first device based on a wide beam of the first device, and a signal quality of the third reference signal obtained by the second device based on the first set beam is the best.

In this embodiment of this application, the first set beam is a best receive beam trained based on a transmit wide beam, and the use of the first set beam as a basis for training the first beam makes performance of training the first beam and the second beam better and further improves accuracy of beam alignment.

In an optional implementation, before the sending a first reference signal to a second device based on a first set beam, the method further includes: obtaining a third reference signal from the first device, and determining the first set beam, where the third reference signal is sent by the first device based on a third beam of the first device, and a signal quality of the third reference signal obtained by the second device based on the first set beam is the best.

In this embodiment of this application, the first set beam is a best receive beam trained based on a transmit beam (namely, the third beam) specified by the first device. The use of the first set beam as a basis for training the first beam may be applicable to a scenario in which the first device requires beam alignment to be within a specific beam range.

In an optional implementation, the obtaining a third reference signal from the first device, and determining the first set beam includes: periodically obtaining the third reference signal from the first device, and determining a fourth candidate beam set, where an $i^{th}$ beam in the fourth candidate beam set is determined based on the third reference signal obtained for the $i^{th}$ time, i being a positive integer; the fourth candidate beam set includes the first set beam.

In an optional implementation, before the obtaining a third reference signal from the first device, the method further includes: sending a fourth reference signal to the second device based on a first initialization beam of the second device, where the fourth reference signal is used to determine the third beam of the first device, and a signal quality of the fourth reference signal obtained by the first device based on the third beam is the best.

In this embodiment of this application, the first set beam is a best receive beam trained based on the third beam of the first device, but the third beam is trained based on the first initialization beam selected by the second device. The use of the first set beam as a basis for training the first beam may be applicable to a scenario in which the second device requires beam alignment to be within a specific beam range.

In an optional implementation, the method further includes: when the third reference signal has been periodically obtained for a third duration, if beams that have been determined in the fourth candidate beam set do not include the first set beam, sending third indication information to the first device, where the third indication information is used to indicate a remaining number of repetitions for the first device to send the third reference signal; or when the third reference signal has been periodically obtained for the third duration, if the beams that have been determined in the fourth candidate beam set include the first set beam, indicating the first device to stop sending the third reference signal. The second device indicates the remaining number of transmissions of the reference signal to the first device based on the included beams in the process of constructing the candidate beam set and searching for beams, so that a number of reference signal transmissions by the first device can be reduced without searching for all the beams, that is, signaling overheads can be reduced, and a time for constructing the candidate beam set can be shortened, which helps to quickly achieve beam alignment.

In an optional implementation, the obtaining a second reference signal from the first device, and determining a second beam includes: obtaining the second reference signal from the first device based on the first set beam; comparing a signal quality of the second reference signal obtained by the second device based on the first set beam with that of the first reference signal obtained by the first device based on the first beam, to determine a third comparison result; sending fourth indication information to the first device based on the third comparison result, where the fourth indication information is used to indicate the first device to send the second reference signal p times, p being a positive integer; and obtaining the second reference signal sent by the second device p times, and updating the fourth candidate beam set to obtain a fifth candidate beam set, where the fifth candidate beam set includes the second beam. Updating and iterating the initially constructed candidate beam set is conducive to improving the accuracy and reliability of beam alignment.

In an optional implementation, before the obtaining a second reference signal sent by the first device based on the first beam, the method further includes: sending a fifth reference signal to the first device based on a second set beam, where the fifth reference signal is used by the first device to determine a fifth beam, a signal quality of the fifth reference signal obtained by the first device based on the fifth beam is the best, and a signal quality of the first reference signal obtained by the first device based on the fifth beam is less than that of the first reference signal obtained by the first device based on the first beam; the second set beam is any beam of the second device other than the first beam. When the best beam combination is trained in multiple rounds based on different set beams, the best round is selected as a beam alignment training result (the first beam and the second beam), which is conducive to improving the accuracy and reliability of beam alignment.

According to a third aspect, an embodiment of this application provides a beam management apparatus applied to a first device. The apparatus includes:

a communication module, configured to obtain a first reference signal from a second device, where the first reference signal is sent by the second device based on a first set beam; and a processing module, configured to determine a first beam, where a signal quality of the first reference signal obtained by the first device based on the first beam is the best;

where the communication module is further configured to send a second reference signal to the second device based on the first beam, where the second reference signal is used to determine a second beam of the second device, and a signal quality of the second reference signal obtained by the second device based on the second beam is the same as that of the first reference signal obtained by the first device based on the first beam.

In an optional implementation, the communication module is further configured to: before obtaining the first reference signal from the second device, send a third reference signal to the second device based on a wide beam of the first device, where the third reference signal is used to determine the first set beam of the second device, and a signal quality of the third reference signal obtained by the second device based on the first set beam is the best.

In an optional implementation, the communication module is further configured to: before obtaining the first reference signal from the second device, send a third reference signal to the second device based on a third beam of the first device, where the third reference signal is used to determine the first set beam of the second device, and a signal quality of the third reference signal obtained by the second device based on the first set beam is the best.

In an optional implementation, the communication module is further configured to: before obtaining the first reference signal from the second device, periodically obtain a fourth reference signal from the second device, and determine a first candidate beam set, where the fourth reference signal is sent by the second device based on a first initialization beam of the second device, and an $i^{th}$ beam in the first candidate beam set is determined based on the fourth reference signal received for the $i^{th}$ time, i being a positive integer; the first candidate beam set includes the third beam, and a signal quality of the fourth reference signal obtained by the first device based on the third beam is the best.

In an optional implementation, the communication module is further configured to: before obtaining the first reference signal from the second device, periodically obtain a fourth reference signal from the second device, and determine a first candidate beam set, where the fourth reference signal is sent by the second device based on a wide beam of the second device, and an $i^{th}$ beam in the first candidate beam set is determined based on the fourth reference signal received for the $i^{th}$ time, i being a positive integer; the first candidate beam set includes a third beam, and a signal quality of the fourth reference signal obtained by the first device based on the third beam is the best.

In an optional implementation, the processing module is further configured to: when the fourth reference signal has been periodically obtained for a first duration, if beams that have been determined in the first candidate beam set do not include the third beam, use the communication module to send first indication information to the second device, where the first indication information is used to indicate a remaining number of repetitions for the second device to send the fourth reference signal; or when the fourth reference signal has been periodically obtained for the first duration, if the beams that have been determined in the first candidate beam set include the third beam, use the communication module to feed back to the second device the signal quality of the fourth reference signal obtained by the first device based on the third beam.

In an optional implementation, the communication module is specifically configured to obtain the first reference signal from the second device based on the third beam; the processing module is further configured to: compare a signal quality of the first reference signal obtained by the first device based on the third beam with that of the fourth reference signal obtained by the first device based on the third beam, to determine a first comparison result; and use the communication module to send second indication information to the second device based on the first comparison result, where the second indication information is used to indicate the second device to send the first reference signal p times, p being a positive integer; the communication module is further configured to receive the first reference signal sent by the second device p times; and the processing module is further configured to update the first candidate beam set to obtain a second candidate beam set, where the second candidate beam set includes the first beam, and the signal quality of the first reference signal obtained by the first device based on the first beam is greater than that of the first reference signal obtained by the first device based on the third beam.

In an optional implementation, the communication module is further configured to obtain a fifth reference signal sent by the second device based on a second set beam, where the second set beam is any beam of the second device other than the first beam; and the processing module is further configured to determine a fifth beam, where a signal quality of the fifth reference signal obtained by the first device based on the fifth beam is the best, and a signal quality of the first reference signal obtained by the first device based on the fifth beam is less than that of the first reference signal obtained by the first device based on the first beam.

In an optional implementation, the communication module is further configured to obtain a data signal from the second device based on the first beam, where the data signal is sent by the second device based on the second beam, and the data signal is associated with a sixth reference signal; and the processing module is further configured to compare a signal quality of the sixth reference signal obtained by the first device based on the first beam with that of the first reference signal obtained by the first device based on the first beam, to obtain a second comparison result, where the second comparison result is used to update a beam used by the first device to receive the data signal or a beam used by the second device to send the data signal.

According to a fourth aspect, this application provides a beam management apparatus applied to a second device. The apparatus includes:
    a communication module, configured to send a first reference signal to a first device based on a first set beam, where the first reference signal is used to determine a first beam of the first device, and a signal quality of the first reference signal obtained by the first device based on the first beam is the best;
    the communication module being further configured to obtain a second reference signal from the first device, where the second reference signal is sent by the first device based on the first beam; and
    a processing module, configured to determine a second beam, where a signal quality of the second reference signal obtained by the second device based on the second beam is the same as that of the first reference signal obtained by the first device based on the first beam.

In an optional implementation, the communication module is further configured to, before sending the first reference signal to the second device based on the first set beam, obtain a third reference signal from the first device, where the third reference signal is sent by the first device based on a wide beam of the first device; and the processing module is further configured to determine the first set beam, where a signal quality of the third reference signal obtained by the second device based on the first set beam is the best.

In an optional implementation, before the sending a first reference signal to a second device based on a first set beam, the method further includes: obtaining a third reference signal from the first device, and determining the first set beam, where the third reference signal is sent by the first device based on a third beam of the first device, and a signal quality of the third reference signal obtained by the second device based on the first set beam is the best.

In an optional implementation, the communication module is specifically configured to periodically obtain the third reference signal from the first device; and the processing module is specifically configured to determine a fourth candidate beam set, where an $i^{th}$ beam in the fourth candidate beam set is determined based on the third reference signal obtained for the $i^{th}$ time, i being a positive integer; the fourth candidate beam set includes the first set beam.

In an optional implementation, the processing module is further configured to: when the third reference signal has been periodically obtained for a third duration, if beams that have been determined in the fourth candidate beam set do not include the first set beam, use the communication module to send third indication information to the first device, where the third indication information is used to indicate a remaining number of repetitions for the first device to send the third reference signal; or when the third reference signal has been periodically obtained for the third duration, if the beams that have been determined in the fourth candidate beam set include the first set beam, use the communication module to indicate the first device to stop sending the third reference signal.

In an optional implementation, the communication module is further configured to obtain the second reference signal from the first device based on the first set beam; the processing module is further configured to: compare a signal quality of the second reference signal obtained by the second device based on the first set beam with that of the first reference signal obtained by the first device based on the first beam, to determine a third comparison result; and use the communication module to send fourth indication information to the first device based on the third comparison result, where the fourth indication information is used to indicate the first device to send the second reference signal p times, p being a positive integer; and the processing module is further configured to use the communication module to obtain the second reference signal sent by the second device p times, and update the fourth candidate beam set to obtain a fifth candidate beam set, where the fifth candidate beam set includes the second beam.

In an optional implementation, the communication module is further configured to, before obtaining the second reference signal sent by the first device based on the first beam, send a fifth reference signal to the first device based on a second set beam, where the fifth reference signal is used by the first device to determine a fifth beam, a signal quality of the fifth reference signal obtained by the first device based on the fifth beam is the best, and a signal quality of the first reference signal obtained by the first device based on the fifth beam is less than that of the first reference signal obtained by the first device based on the first beam; the second set beam is any beam of the second device other than the first beam.

According to a fifth aspect, this application provides a communication apparatus. The apparatus includes: a logic circuit and an input/output interface, where
the input/output interface is configured to obtain a first reference signal from a second device, where the first reference signal is sent by the second device based on a first set beam; and
the logic circuit is configured to determine a first beam, where a signal quality of the first reference signal obtained by the first device based on the first beam is the best; and
the input/output interface is further configured to send a second reference signal to the second device based on the first beam, where the second reference signal is used to determine a second beam of the second device, and a signal quality of the second reference signal obtained by the second device based on the second beam is the same as that of the first reference signal obtained by the first device based on the first beam.

According to a sixth aspect, this application provides a communication apparatus. The apparatus includes: a logic circuit and an input/output interface, where
the input/output interface is configured to transmit a first reference signal to a first device based on a first set beam, where the first reference signal is used to determine a first beam of the first device, and a signal quality of the first reference signal obtained by the first device based on the first beam is the best;
the input/output interface is further configured to obtain a second reference signal from the first device, where the second reference signal is sent by the first device based on the first beam; and
the logic circuit is configured to determine a second beam, where a signal quality of the second reference signal obtained by the second device based on the second beam is the same as that of the first reference signal obtained by the first device based on the first beam.

According to a seventh aspect, this application provides a communication apparatus. The apparatus includes a processor, where the processor is coupled to a memory, the memory is configured to store a computer program or instructions, and the processor is configured to execute the computer program or the instructions, to perform the method according to the implementations of the first aspect or the second aspect. The memory may be located inside or outside the apparatus. There are one or more processors.

According to an eighth aspect, this application provides a communication apparatus. The apparatus includes: a processor and an interface circuit, where the interface circuit is configured to communicate with another apparatus, and the processor is configured to perform the method according to the implementations of the first aspect or the second aspect.

According to a ninth aspect, this application provides a communication system. The system includes: a network device configured to perform the method according to the implementations of the first aspect and a terminal device configured to perform the method according to the implementations of the second aspect.

According to a tenth aspect, this application further provides a chip system. The system includes: a processor, configured to perform the method according to the implementations of the first aspect or the second aspect.

According to an eleventh aspect, this application further provides a computing program product, including computer executable instructions that, when executed on a computer, cause the method according to the implementations of the first aspect or the second aspect to be performed.

According to a twelfth aspect, this application further provides a computer-readable storage medium. The computer-readable storage medium has a computer program or instructions stored therein. When the instructions are executed on a computer, the method according to the implementations of the first aspect or the second aspect is implemented.

For technical effects that can be achieved in the third aspect to the twelfth aspect, refer to the technical effects that can be achieved by the corresponding technical solutions in the first aspect and the second aspect. Details are not described herein again.

DESCRIPTION OF EMBODIMENTS

The embodiments of this application may be applied to a non-terrestrial network (non-terrestrial network, NTN), a 4th generation (4th generation, 4G) network, a 5th generation (5th generation, 5G) network, or a future communication network.

The technical terms in this application are described below.

(1) Beam

Figure 1:
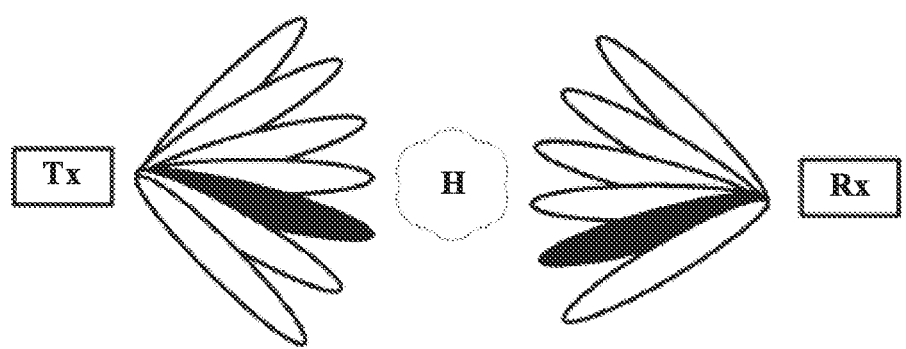
FIG. 1 is a schematic diagram of a beam distribution.

Both a transmit end and a receive end can have beams formed through their respective antennas. As illustrated in FIG. 1, a transmit end (Tx)/receive end (Rx) has one or more beams formed through a plurality of antennas. As more antennas are used, a width of a beam formed becomes narrower. A beam with a relatively narrow width may be referred to as a narrow beam, and a beam with a relatively wide width may be referred to as a wide beam. In terms of space, one beam may correspond to one angular direction range, and an angular direction range corresponding to the narrow beam is less than that corresponding to the wide beam. Optionally, one or more narrow beams may be formed through the plurality of antennas on the transmit end/receive end. Optionally, one or more wide beams may be formed through the plurality of antennas on the transmit end/receive end.

Other beams, such as a first beam and a first set beam, other than a wide beam below in the embodiments of this application may be understood as beams with relatively narrow beam widths, that is, narrow beams. The wide beam may be understood as a beam covering all directions, that is, a quasi-omni (quasi-omni) beam. Alternatively, an angular direction range of the wide beam may also be less than all directions, but corresponds to an angular direction range covered by a plurality of narrow beams.

(2) Signal Quality

A signal quality of a reference signal obtained based on a beam in an embodiment of this application may be represented by received signal strength (received signal strength, RSS) or signal-to-noise ratio (signal-to-noise ratio, SNR) data measured based on the reference signal, where the SNR refers to a ratio of signal strength to noise strength. A larger SNR indicates less noise mixed in the signal and a better signal strength or signal quality.

(3) A plurality of in the embodiments of this application means two or more. The term "and/or" describes an association relationship between associated objects, and indicates that three relationships may exist. For example, A and/or B may indicate that only A exists, both A and B exist, and only B exists. The character "/" generally indicates an "or" relationship between the associated objects. Moreover, it should be understood that although the terms "first", "second", and the like may be used in the embodiments of the disclosure to describe objects, these objects should not be limited to these terms. These terms are merely used to distinguish the objects from one another.

(4) The terms "include" and "have" and any variations thereof mentioned in the description of the embodiments of this application are intended to cover a non-exclusive inclusion. For example, a process, a method, a system, a product, or a device that includes a series of steps or units is not limited to the listed steps or units, but optionally further includes other unlisted steps or units, or optionally further includes other steps or units inherent to the process, the method, the product, or the device. It should be noted that in the embodiments of this application, the term such as "exemplary" or "for example" is used to represent giving an example, an illustration, or a description. Any embodiment or design described by "exemplary" or "for example" in the embodiments of this application should not be construed as being more preferred or advantageous than other embodiments or designs. To be precise, the use of the term such as "exemplary" or "for example" is intended to present a related concept in a specific manner.

An existing beam alignment related technology is briefly described below.

Currently, the 802.11ad standard provides a hierarchical sweeping solution to select beams. For a transmit end and a receive end, the following is separately performed: sweeping antenna sectors (or referred to as sectors), and selecting a best sector for sending signals and a best sector for receiving signals; and then traversing the best sectors to form their respective transmit beams and receive beams. A sector is an antenna radiation pattern of a specific width that is generated by changing antenna weights applied to phased array elements.

Figure 2:
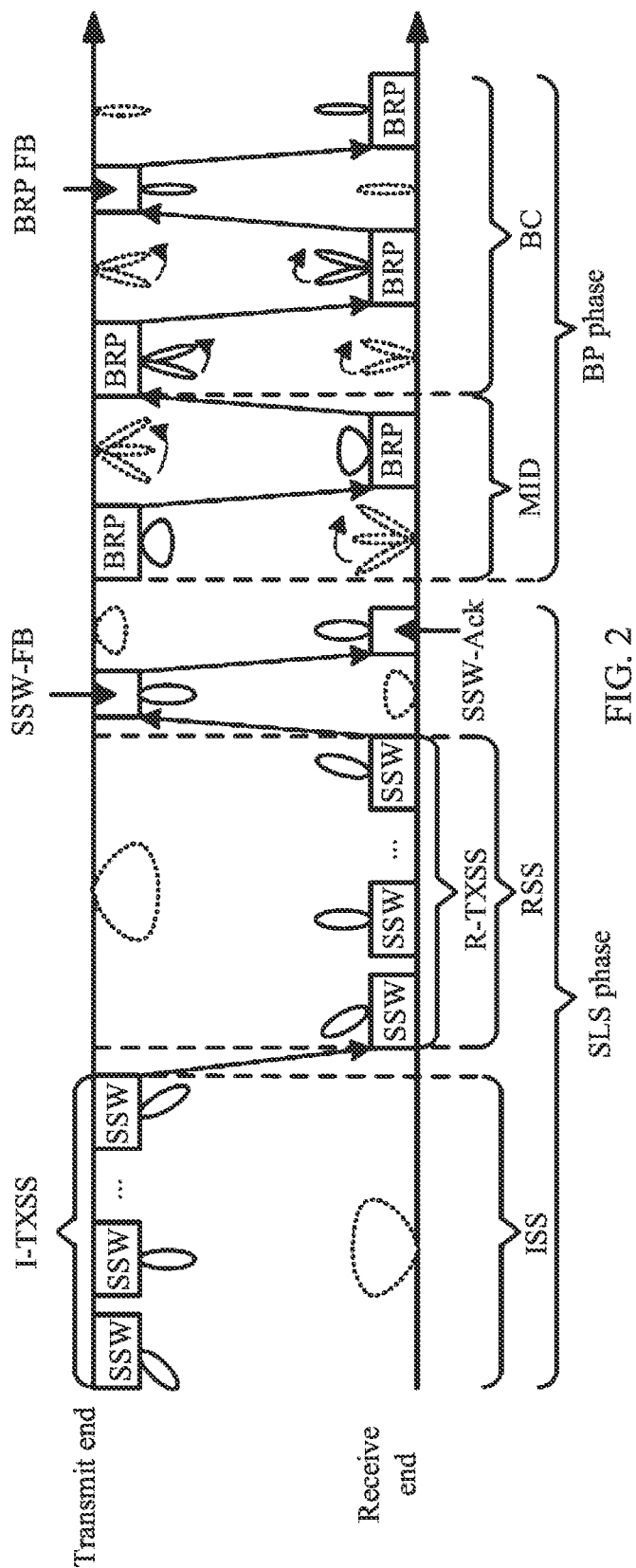
FIG. 2 is a schematic diagram of a hierarchical sweeping procedure.

FIG. 2 is a schematic diagram of a hierarchical sweeping procedure, including the following phases.

(1) Sector level sweep (sector level sweep, SLS) phase: training respective best transmit sectors of a transmit end and a receive end.

The SLS includes an initiator sector sweep (initiator sector sweep, ISS), a responder sector sweep (responder sector sweep, RSS), a sector sweep feedback (sector sweep feedback, SSW-FB), and a sector sweep acknowledgment (sector sweep acknowledgment, SSW-ACK). A device that initiates beamforming training is referred to as an initiator (initiator), and a recipient is referred to as a responder (responder). Referring to FIG. 2, during the ISS, the transmit end sends a training packet from a predefined sector, for example, sends SSWs based on all sectors. Receive antennas of the receive end are in a unidirectional mode, and measure signal strengths corresponding to all the sectors of the transmit end. During the RSS, the receive end sends a training packet from a predefined sector, for example, sends SSWs based on all sectors. Receive antennas of the transmit end are in a unidirectional mode, and measure received signal strengths corresponding to all the sectors of the receive end. During the SSW-FB, the transmit end provides a sector sweep feedback to the receive end to indicate a sector with a highest received signal strength. During the SSW-ACK, the receive end provides a sector sweep acknowledgment to the transmit end to indicate the sector with the highest received signal strength. The training packet is transmitted by using a low-power low-rate (control physical layer PHY mode) modulation and coding scheme (modulation and coding scheme, MCS) to ensure reliable communication required for establishing an initial beamforming link.

(2) Beam refinement protocol (beam refinement phase, BRP) phase: training respective best receive sectors of the transmit end and the receive end, and traversing within and near the best transmit sectors/best receive sectors, to select beam combination (beam combining, BC) for data transmission.

The BRP includes MID and BC. A device that initiates beam refinement training is referred to as an initiator (initiator), and a recipient is referred to as a responder (responder). Referring to FIG. 2, during the MID, the transmit end uses a wide beam (such as a quasi-omni beam) for BRP. The receive antennas of the receive end are in a unidirectional mode, traverse all sectors of the receive end, and measure signal strengths corresponding to the receive sectors. The receive end and the transmit end are switched. The receive end uses a wide beam (such as a quasi-omni beam) for BRP. The receive antennas of the transmit end are in a unidirectional mode, traverse all sectors of the transmit end, and measure signal strengths corresponding to the receive sectors. During the BC, the transmit end utilizes a plurality of narrow beams in directions covered in and near its best transmit sector to send BRPs, and the receive end sweeps the BRPs, one by one, in the directions covered within and near the best transmit sector of the transmit end, to determine a best transmit beam of the transmit end. The receive end and the transmit end are switched. The receive end utilizes a plurality of narrow beams in directions covered within and near its best transmit sector to send BRPs, and the transmit end sweeps the BRPs, one by one, in the directions covered in and near the best transmit sector of the receive end, to determine a best transmit beam of the receive end.

The algorithm complexity of such a method is high and can be up to O(N) (N indicates a total number of narrow beams of the transmit end or the receive end), which is not conducive to fast beam alignment.

In view of this, embodiments of this application provide a beam management method. First, a beam used by one of a transmit end and a receive end to send and receive signals is trained, and then a beam used by the other party to send and receive signals is determined based on the beam, thereby quickly achieving beam alignment.

The beam management method provided in the embodiments of this application may be applied to an E-band millimeter wave transmission system (E-Band millimeter microwave transmission system), a satellite communication system (satellite communication system), a long term evolution (long term evolution, LTE) system, or a 5G new radio system (5g new radio system); or a new radio vehicle to everything (vehicle to everything, NR V2X) system; or may be applied to a system with LTE and 5G hybrid networking; or a device-to-device (device-to-device, D2D) communication system, a machine to machine (machine to machine, M2M) communication system, the internet of things (internet of things, IoT), or an unmanned aerial vehicle communication system; or a communication system that supports a plurality of wireless technologies, for example, an LTE technology and an NR technology; or a non-terrestrial communication system, for example, a satellite communication system or a high-altitude communication platform. In addition, optionally, the communication system may also be applied to a narrowband internet of things (narrow band-internet of things, NB-IoT) system, an enhanced data rate for GSM evolution (enhanced data rate for GSM evolution, EDGE) system, a wideband code division multiple access (wideband code division multiple access, WCDMA) system, a code division multiple access 2000 (code division multiple access, CDMA2000) system, a time division synchronous code division multiple access (time division-synchronization code division multiple access, TD-SCDMA) system, and a future-oriented communication technology. The communication system includes a first device and a second device. The beam management method provided in the embodiments of this application implements beam alignment between the first device and the second device. When the first device serves as a transmit end, the second device serves as a receive end. When the first device serves as a receive end, the second device may serve as a transmit end. The first device may be a network device, and the second device may be a terminal device. Alternatively, the first device may be a terminal device, and the second device is a network device.

Figure 3:
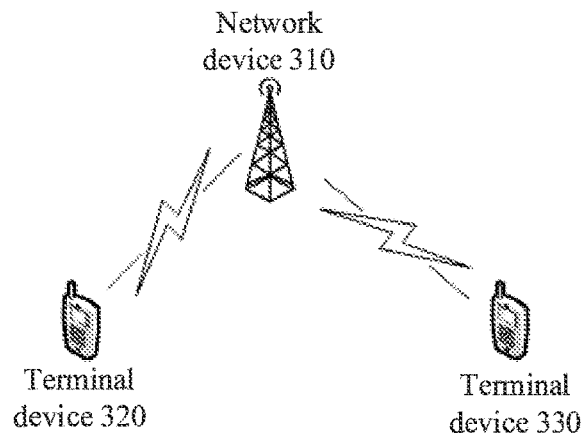
FIG. 3 shows a communication system according to an embodiment of this application.

A wireless communication system is generally composed of cells, each cell includes a network device, the network device provides communication services to a plurality of terminals, and each terminal device can establish beam alignment with the network device. For example, FIG. 3 is a schematic diagram of an architecture of a communication system 300 according to an embodiment of this application. The communication system 300 includes a network device 310, a terminal device 320, and a terminal device 330. In actual application, there may be one or more network devices and one or more terminal devices. A number and style of network devices and terminal devices in the communication system shown in FIG. 3 are only adaptive examples, and are not limited in the embodiments of this application.

The network device may also be referred to as an access network device, a base station, a relay station, an access node (access node, AN), a wireless access point (access point, AP), or the like. For example, the network device may be a base transceiver station (base transceiver station, BTS) in a global system for mobile communications (global system for mobile communication, GSM) or code division multiple access (code division multiple access, CDMA) network, or may be an NB (NodeB) in a wideband code division multiple access (wideband code division multiple access, WCDMA) network, or may be an eNB or an eNodeB (evolutional NodeB) in a long term evolution (long term evolution, LTE) system. Alternatively, the network device may be a radio controller in a cloud radio access network (cloud radio access network, CRAN) scenario. Alternatively, the network device may be a base station device in a 5G network or a network device in a future evolved PLMN network. Alternatively, the network device may be a wearable device or a vehicle-mounted device.

The terminal device may also be referred to as user equipment (user equipment, UE), a station (station, STA), an access terminal, a terminal unit, a terminal station, a mobile station, a mobile, a remote station, a remote terminal, a mobile device, a mobile terminal, a terminal, a wireless communication device, a terminal agent, a terminal apparatus, or the like. For example, the terminal device may be a cellular phone, a cordless phone, a session initiation protocol (session initiation protocol, SIP) phone, a wireless local loop (wireless Local Loop, WLL) station, a personal digital assistant (personal digital assistant, PDA), a handheld device having a wireless communication function, a computing device or another processing device connected to a wireless modem, a vehicle, a vehicle-mounted device or a vehicle-mounted module, a wearable device, a terminal device in a 5G network, a terminal device in a future evolved PLMN network, or the like.

Figure 4:
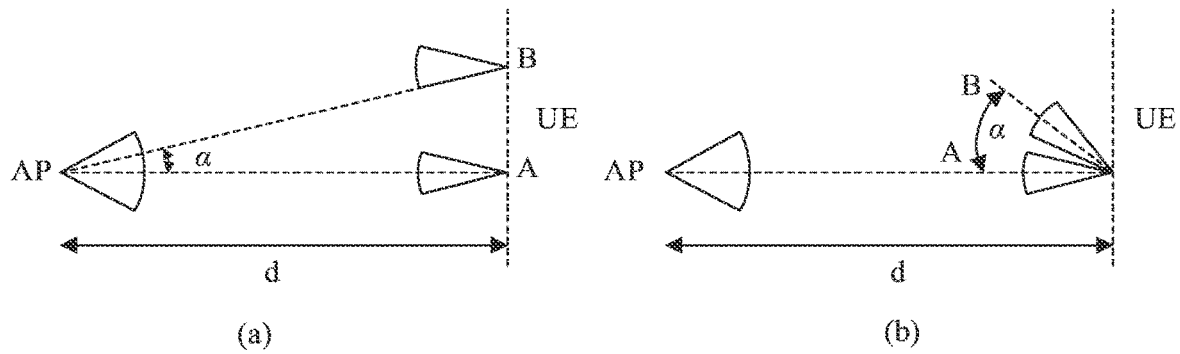
FIG. 4 is a schematic diagram of a scenario in which a device is moving according to an embodiment of this application.

The embodiments f this application can be applied to a scenario in which a device is moving. For example, FIG. 4 shows that a terminal device is in a moving state. Specifically, (a) in FIG. 4 shows that the terminal device moves in a straight line. UE represents the terminal device, and AP represents a network device. The UE moves from point A to point B along the straight line. An angle of rotation relative to a location of the AP is a, and d represents a straight-line distance between the AP and the UE. (b) in FIG. 4 shows that the terminal device performs rotational movement. The UE represents the terminal device, and the AP represents the network device. The UE moves from point A to point B by rotating an angle of a, and d represents the straight-line distance between the AP and the UE. According to the beam management method provided in the embodiments of this application, beams of the network device and each moving terminal can be aligned at any time, and a best aligned beam is constantly switched, to provide wireless coverage for the terminal device, and ensure uninterrupted, always-on communication.

The beam management method provided in the embodiments of this application is described in detail below.

Figure 5:
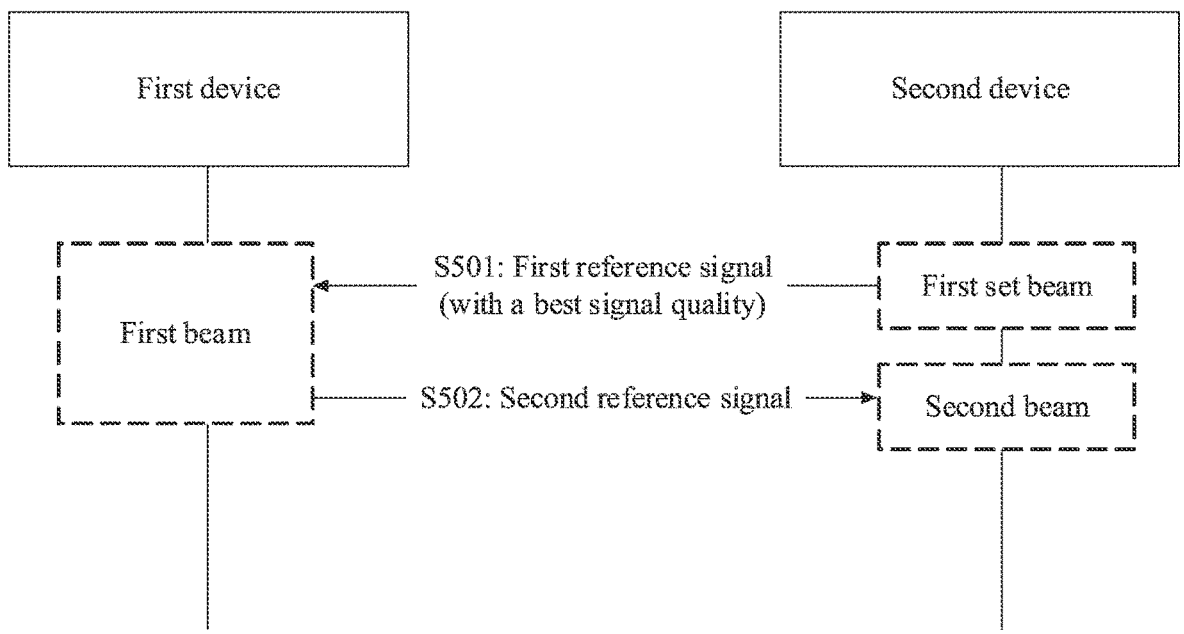
FIG. 5 is a schematic flowchart of a beam management method according to an embodiment of this application.

FIG. 5 shows a beam management method, including the following steps.

S501: A first device obtains a first reference signal from a second device, and determines a first beam.

The first reference signal is sent by the second device based on a first set beam, and a signal quality of the first reference signal obtained by the first device based on the first beam is the best.

Optionally, the second device may select the first set beam based on a specific rule, or the second device may randomly select a beam on the second device as the first set beam. A selection strategy for the first set beam is to be described later. Optionally, for the first device and the second device, a beam ID (Beam ID) is used to identify a beam.

Figure 6A:
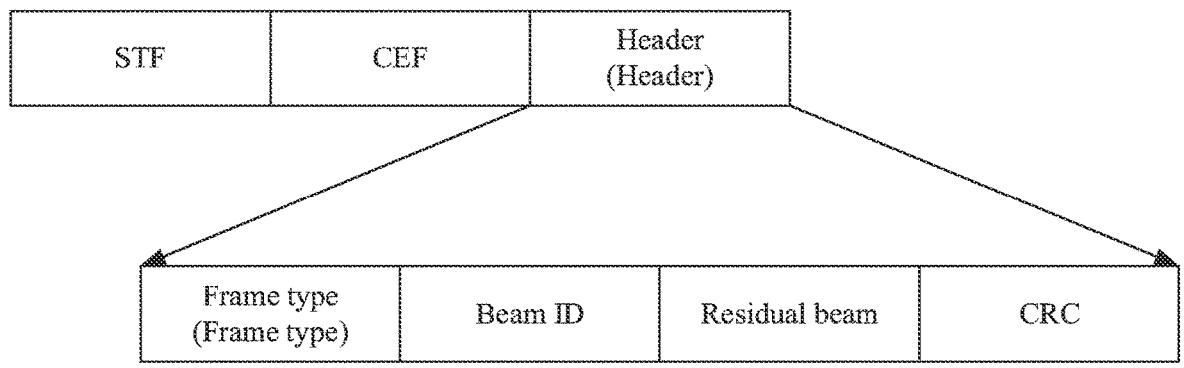
FIG. 6a is a schematic diagram of a structure of a beam sweep frame according to an embodiment of this application.

Optionally, FIG. 6a shows a structure of a beam sweep frame (sweep frame). The beam sweep frame includes the following fields: a short training field (short training field, STF) for synchronizing time, a channel estimation field (channel estimation field, CEF) for estimating a channel, and a header (Header). The header includes a frame type (Frame Type), a beam ID (Beam ID), and a residual beam (Residual Beam, RBeam). The frame type is a beam sweep frame, and the beam ID is used to identify a transmit beam corresponding to the sweep frame. RBeam indicates a remaining number of times that the beam sweep frame needs to be sent subsequently. When the first reference signal is implemented by the beam sweep frame, the beam ID in the beam sweep frame is used to identify the first set beam. In addition, FIG. 6a shows that the header of the beam sweep frame further includes the following flag: a cyclic redundancy check (Cyclic Redundancy Check, CRC).

S502: The first device sends a second reference signal to the second device based on the first beam, where the second reference signal is used to determine a second beam of the second device.

In an optional implementation, a signal quality of the second reference signal obtained by the second device based on the second beam is the same as or similar to that of the first reference signal obtained by the first device based on the first beam, or a difference (or variation) between the signal quality of the second reference signal obtained by the second device based on the second beam and the signal quality of the first reference signal obtained by the first device based on the first beam is less than a set threshold.

In another optional implementation, if a transmit power of the first device is significantly different from that of the second device, for the second beam, it may also be understood that the second reference signal obtained by the second device based on the second beam has the best signal quality. In addition, regarding determining (training) the first beam of the first device and the second beam of the second device to form a best beam combination, a convergence condition may also be set as follows: A quality of a reference signal obtained by the first device from the second device based on the first beam is the best, or is the same as or similar to that of a reference signal latest obtained by the first device from the second device one or more times, that is, the training is expected to be smooth and stable. Similarly, a quality of a reference signal obtained by the second device from the first device based on the second beam is the best, or is the same as or similar to that of a reference signal latest obtained by the second device from the first device one or more times.

Figure 6B:
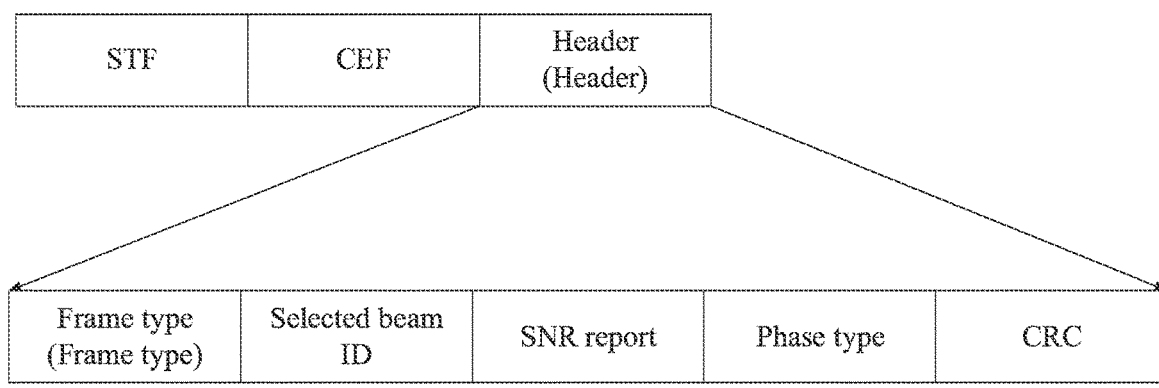
FIG. 6b is a schematic diagram of a structure of a beam sweep feedback frame according to an embodiment of this application.

Optionally, the second reference signal may also be used to indicate the signal quality of the first reference signal obtained by the first device based on the first beam. FIG. 6b shows a structure of a beam sweep feedback frame (Sweep-FB frame). The beam sweep feedback frame includes the following fields: a short training field (short training field, STF) for synchronizing time, a channel estimation field (channel estimation field, CEF) for estimating a channel, and a header (Header). The header includes a frame type (Frame Type), a selected beam ID (Beam ID), and an RSS/SNR report. The frame type is a beam sweep feedback frame, and the selected beam ID is used to identify a best receive beam latest determined by a device that sends the beam sweep feedback frame. The RSS/SNR report is used to feed back a signal quality of a reference signal obtained based on the best receive beam, and the signal quality may be indicated by RSS or SNR data. When the second reference signal is implemented by the beam sweep feedback frame, in the beam sweep feedback frame, the selected beam ID is used to identify the first beam, and the signal quality fed back by the RSS/SNR report is the signal quality of the first reference signal obtained by the first device based on the first beam. Then, by obtaining the beam sweep feedback frame, the second device can determine the signal quality of the first reference signal obtained by the first device based on the first beam, or know the best receive beam of the first device with the first set beam used as a transmit beam.

In addition, FIG. 6b shows that the header of the beam sweep feedback frame further includes the following flag: a cyclic redundancy check (cyclic redundancy check, CRC) and a phase type (Phase Type). The CRC is used to check the beam sweep feedback frame. The phase type is used to indicate a device receiving the beam sweep feedback frame. For example, a next-phase operation of the second device may be defined according to actual needs. Definitions in this embodiment of this application are to be described in the subsequent embodiments.

In this embodiment of this application, at initialization, the first device serves as a receive end, and the second device serves as a transmit end. First, a transmit beam of the second device is set, and a best receive beam, that is, the first beam, of the first device in this case is determined. Then, the receive end and the transmit end are switched. A best receive beam, that is, the second beam, of the second device is determined based on the first beam. By using the consistency between uplink and downlink beams, the first device can obtain, based on the first beam, data transmitted by the second device based on the second beam; conversely, the second device can also obtain, based on the second beam, data transmitted by the first device based on the first beam, thereby quickly achieving beam alignment.

Implementations of the selection strategy for the first set beam and a corresponding beam management method are described in detail below with reference to Solution 1, Solution 2, and Solution 3.

Solution 1: The beam alignment between the first device and the second device may be divided into a beam combination build phase and a beam combination update phase. In the beam combination build phase, in the case that a wide beam is used as a transmit beam at one end, a best receive beam at the other end is trained. The first set beam of the second device may be the best receive beam of the second device determined in this phase. In the beam combination update phase, after best receive beams at both ends are determined in the beam combination build phase, adjustment and update are performed, to achieve beam alignment between the first device and the second device by training. It should be noted that the division of the beam combination build phase and the beam combination update phase is only for the convenience of understanding this solution. In actual application, the phases may not be obtained according to this division, but may be obtained according to other divisions, or even no phase division is performed, which is not limited in the embodiments of this application.

The beam combination build (build) phase mentioned in this solution is described in detail below. The beam combination build phase mainly includes the following processes A1 and A2. It should be noted that regarding the execution order of the process A1 and the process A2, A1 may be performed before A2, or A2 may be performed before A1, which is not limited in the embodiments of this application.

A1: In the case that a wide beam of the second device is used as a transmit beam, a best receive beam of the first device is trained. This may be implemented as follows: The second device sends a fourth reference signal to the first device based on the wide beam of the second device, where the fourth reference signal is used to determine a third beam of the first device, and a signal quality of the fourth reference signal obtained by the first device based on the third beam is the best.

Optionally, the fourth reference signal may be implemented by a beam sweep frame shown in FIG. 6a. A beam ID in the beam sweep frame used as the fourth reference signal in this process is used to identify the wide beam of the second device.

Optionally, the second device may periodically send the fourth reference signal to the first device, and then the first device selects one beam each time to receive the fourth reference signal, and records a signal quality of the fourth reference signal obtained each time. An embodiment of this application provides a selection strategy as follows: Assuming that a total number of beams on the first device is N, the N beams may be divided into n beam ranges, where N is greater than 1, n is greater than 1, and n is less than N; and both n and N are positive integers. Optionally, a number of beams in each beam range is the same or similar. The first device periodically obtains the fourth reference signal from the second device, and selects an $i^{th}$ beam to receive the fourth reference signal obtained for the $i^{th}$ time. When i is less than or equal to n, the $i^{th}$ beam belongs to one of the n beam ranges. For example, n is 2, the 1st beam belongs to one of the two beam ranges, and the 2nd beam belongs to the other of the two beam ranges. When i is greater than n, the $i^{th}$ beam belongs to a second beam range, a signal quality corresponding to the second beam range is the best among the n beam ranges. A signal quality corresponding to any one of the n beam ranges is related to a signal quality of the fourth reference signal obtained by the first device based on at least one beam in the beam range. Based on the foregoing selection strategy, there is no need to sequentially traverse and sweep all the beams of the second device, and the third beam can be selected within a limited number (N) of times, which helps to quickly achieve beam alignment.

Then, based on the foregoing selection strategy, the first device periodically obtains the fourth reference signal from the second device, and can determine a first candidate beam set. An $i^{th}$ beam in the first candidate beam set is determined based on the fourth reference signal obtained for the $i^{th}$ time, i being a positive integer. The first candidate beam set includes the third beam. In addition, the first candidate beam set further includes a signal quality of a received fourth reference signal corresponding to each beam, and the signal quality is indicated by SNR data.

Optionally, the parameter n in the corresponding selection strategy is 2, that is, the N beams of the first device are divided into a beam range 1 and a beam range 2. Beams included in the first candidate beam set may be determined by constructing a binary tree. A root node of the binary tree structure has no practical meaning, and each of the remaining tree nodes indicates one beam. Specifically, each tree node may represent a beam ID. Alternatively, the N beams of the first device are mapped to a [0, 1] interval, each beam corresponds to one sub-interval of the [0, 1] interval, and one tree node corresponds to a range in the [0, 1] interval. A value is randomly selected from the range, and if the value falls in a sub-interval corresponding to a beam, the tree node indicates the beam. In an optional implementation, a parent node in the binary tree is connected to a maximum of two child nodes. Taking the first device including 16 beams with beam IDs ranging from 0 to 15 as an example, the construction of a binary tree with beam IDs as tree nodes to determine the beams in the first candidate beam set is described in detail below.

Figure 7:
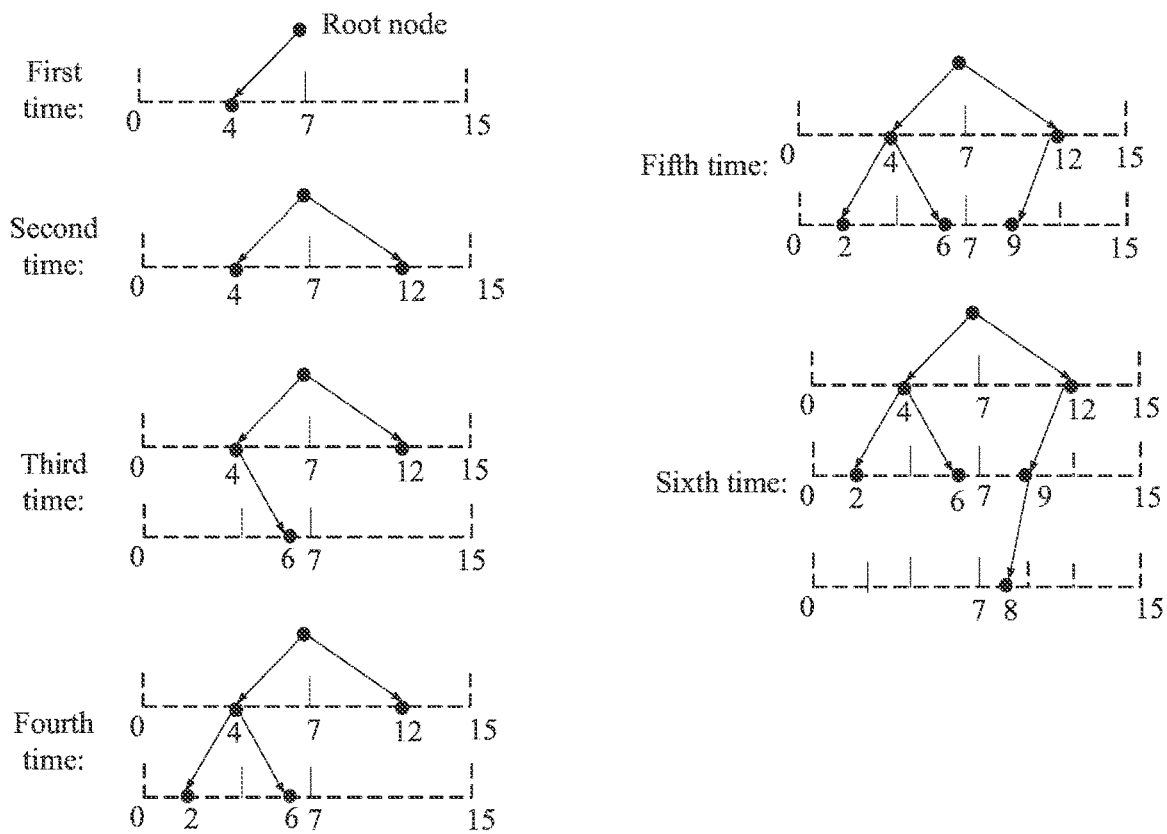
FIG. 7 is a schematic diagram 1 of a candidate beam set establishment procedure according to an embodiment of this application.

FIG. 7 is a schematic diagram of a candidate beam set establishment procedure. In this process, the second device is set to periodically send a fourth reference signal on a wide beam. For the first time, the first device may select any beam from a beam range 1 indicated by beam IDs 0 to 7, for example, select a beam 4 (that is, a beam whose beam ID is 4, and other descriptions below are similar) to obtain a fourth reference signal, record that the first beam in the first candidate beam set is the beam 4, and record SNR data, R1, corresponding to the beam 4. For the second time, the first device may select any beam from a beam range 2 indicated by beam IDs 8 to 15, for example, select a beam 12 to obtain a fourth reference signal, record that the second beam in the first candidate beam set is the beam 12, and record SNR data, R2, corresponding to the beam 12.

After the first two times of selection, a signal quality corresponding to the beam range 1 may be represented by R1, and a signal quality corresponding to the beam range 2 may be represented by R2. Assuming that the signal quality corresponding to the beam range 1 is stronger than that corresponding to the beam range 2, the first device may select any beam from an interval of a beam 0 to a beam 3 or any beam from an interval of a beam 5 to a beam 7 for the third time, for example, select a beam 6 to obtain a fourth reference signal, record that the third beam in the first candidate beam set is the beam 6, and record SNR data, R3, corresponding to the beam 6. After the third time of selection, the signal quality corresponding to the beam range 1 is determined by R1 and R3, and the signal quality corresponding to the beam range 2 is still determined by R2. Assuming that the signal quality corresponding to the beam range 1 is stronger than that corresponding to the beam range 2 after the third time of selection, the second device may select any beam from the interval of the beam 0 to the beam 3 or any one of the beam 5 or the beam 7 for the fourth time, for example, select a beam 2 to obtain a fourth reference signal, record that the fourth beam in the first candidate beam set is the beam 2, and record SNR data, R4, corresponding to the beam 2. After the fourth time of selection, the signal quality corresponding to the beam range 1 is determined by R1, R3, and R4, and the signal quality corresponding to the beam range 2 is still determined by R2. Assuming that the signal quality corresponding to the beam range 1 is weaker than that corresponding to the beam range 2 after the fourth time of selection, the first device may select any one of a beam 8 to a beam 11 or any beam from an interval of a beam 13 to the beam 15 for the fifth time, for example, select a beam 9 to obtain a fourth reference signal, record that the fifth beam in the fourth candidate beam set is the beam 9, and record SNR data, R5, corresponding to the beam 9. After the fifth time of selection, the signal quality corresponding to the beam range 1 is determined by R1, R3, and R4, and the signal quality corresponding to the beam range 2 is determined by R2 and R5. Assuming that the signal quality corresponding to the beam range 1 is weaker than that corresponding to the beam range 2 after the fifth time of selection, the first device may select any one of the beam 8, the beam 10, and the beam 11 for the sixth time, for example, select the beam 8 to obtain a fourth reference signal, record that the sixth beam in the fourth candidate beam set is the beam 8, and record SNR data, R6, corresponding to the beam 8. By analogy, the signal quality corresponding to the beam range 1 and the signal quality corresponding to the beam range 2 are continuously updated and compared, to determine a next node until the tree depth reaches a maximum depth, and the establishment of the candidate beam set is completed. A beam represented by the last determined node may be considered as the third beam in the first candidate beam set. As an illustration, FIG. 7 shows a process of selecting beams for the foregoing six times, which ends with the beam 8 selected for the sixth time. Finally, the first candidate beam set includes the beam 4, the beam 12, the beam 6, the beam 2, the beam 9, and the beam 8. The beam 8 is the foregoing third beam, and the SNR data R6 corresponding to the beam 8 indicates that a signal quality of the obtained fourth reference signal is the best.

Optionally, in one manner, a number of repetitions for the second device to periodically send the fourth reference signal may depend on the number N of beams included in the second device. To be specific, the second device sends the fourth reference signal N times based on the wide beam, and when the fourth reference signal is implemented by a beam sweep frame, a value of RBeam in a beam sweep frame sent for the $i^{th}$ time is N-i. In another manner, it may be assumed that when the fourth reference signal has been periodically obtained for a first duration, the first device may estimate a number of beams that may further need to be determined for the fourth candidate beam, so as to indicate whether the second device subsequently needs to send the fourth reference signal and a remaining number of repetitions if the fourth reference signal subsequently needs to be sent. The first duration herein may be predefined, and the first device receives the fourth reference signal less than N times in the first duration. For the foregoing another manner, an embodiment of this application provides an implementation executed by the first device, which is as follows.

In one possible case, when the first device has periodically obtained the fourth reference signal for the first duration, beams that have been determined in the first candidate beam set do not include the third beam. Then the first device sends first indication information to the second device. The first indication information is used to indicate the remaining number of repetitions for the second device to send the fourth reference signal. The remaining number of repetitions is related to a beam range in which the beams that have been determined in the first candidate beam set are distributed.

Figure 8:
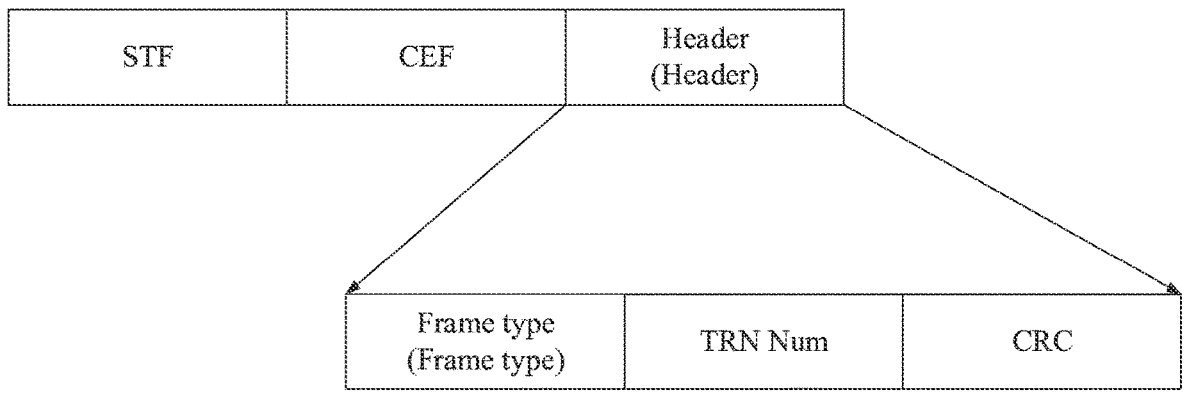
FIG. 8 is a schematic diagram of a structure of a beam sweep insertion frame according to an embodiment of this application.

Optionally, FIG. 8 shows a structure of a beam sweep insertion frame. The beam sweep insertion frame includes the following fields: a short training field (short training field, STF) for synchronizing time, a channel estimation field (channel estimation field, CEF) for estimating a channel, and a header. The header includes a frame type (Frame Type) and a train number (train number, TRN Num). The frame type (Frame Type) is a beam sweep insertion frame. The TRN Num is used to feed back a remaining number of repetitions for a device that obtains the beam sweep insertion frame to send a current beam. Optionally, FIG. 8 further shows that the beam sweep insertion frame includes a CRC. That is, in this case, when the first duration is reached, the first device may send the beam sweep insertion frame shown in FIG. 8 to the second device, to indicate the remaining number of repetitions for the second device to send the fourth reference signal. In other words, the first indication information may be implemented by the TRN Num in the beam sweep insertion frame.

Feeding back the beam sweep insertion frame in the process of constructing the candidate beam set and searching for beams can reduce a number of reference signal transmissions without searching for all the beams, that is, reduce signaling overheads and shorten a time for constructing the candidate beam set, which helps to quickly achieve beam alignment.

Optionally, the remaining number of repetitions indicated by the first indication information may be determined using the following method:

The N beam IDs of the first device are mapped to the [0, 1] interval. The first candidate beam set is determined by constructing a binary tree. A maximum tree depth may be determined by a range represented by the deepest node. For example, the range is set to C/N. C<1 and is a given constant to control the precision. The smaller the value, the higher the precision. N is a number of available beams, and the maximum tree depth $$D = \left\lceil \log_2 \frac{N}{C} \right\rceil$$

can be obtained. It may be assumed that when the first device obtains a beam sweep frame (the fourth reference signal) for the $T^{th}$ time, where $$T = \left\lceil \frac{1}{\varepsilon} \sqrt{N \log_2 N} \right\rceil,$$

that is, the first duration is reached, the beam sweep insertion frame is sent to the second device. $\varepsilon$ is the golden ratio of 0.618, which is a reference value considering the complexity of the algorithm. If the tree depth d<⌈$\log_2$ N⌉ when the first duration is reached, it indicates that an SNR curve measured multiple times in the first duration does not satisfy a weak Lipschitz (weak Lipschitz) condition, that is, there is a sudden change in the curve. According to procedures of the algorithm, the complete binary tree needs to be traversed, and all the beam IDs of the first device need to be traversed, so that the remaining number of repetitions indicated by the first indication information can be determined as T'=N−T. Conversely, if the tree depth d≥⌈$\log_2$ N⌉ when the first duration is reached, it indicates that an optimal value has been nearly reached, and the remaining reachable tree depth is R=D−d. Optionally, the remaining number of repetitions indicated by the first indication information may be determined based on R and the number of beams that have been determined in the first candidate beam set. For example, the second device may be indicated to send $2^R$ beam sweep frames after obtaining the beam sweep insertion frame.

In another possible case, when the first device has periodically obtained the fourth reference signal for the first duration, the beams that have been determined in the first candidate beam set include the third beam. Then the first device may indicate the second device to stop sending the fourth reference signal. Optionally, based on the phase type (Phase Type) in the beam sweep feedback frame shown in FIG. 6b, the first device may send a beam sweep feedback frame to the second device to indicate the second device to stop sending the fourth reference signal. Specifically, the value of the phase type in the beam sweep feedback frame sent by the first device in this case may be 1, indicating the second device to end training the best receive beam of the first device, that is, stop sending the fourth reference signal, and prepare to enter the subsequent beam combination update phase.

Further optionally, to avoid local optimum extremity, in one manner, it may be assumed that when i is greater than n, if the number of times beam ranges with the best signal quality that are consecutively determined are the same exceeds a set threshold, a beam to receive the fourth reference signal is not to be selected the next time from the beam range corresponding to the best signal quality, but a beam is selected from another beam range. In another manner, due to impact such as noise, the beam combination building may be considered as a random bandits problem. The local optimum extremity can be avoided based on a hierarchical optimistic optimization (Hierarchical Optimistic Optimization, HOO) algorithm in reinforcement learning. The HOO algorithm may also be considered as a Monte-Carlo tree search algorithm. As a non-gradient optimization algorithm, the HOO algorithm improves an upper bound of confidence interval (Upper Confidence bound, UCB) by constructing a tree structure, and then obtains an optimistic sampling strategy. The core idea of the algorithm is to make a detailed estimation on an interval with large returns and a loose estimation on other parts based on accumulated average returns, so as to reduce the total number of explorations and quickly converge to a globally optimal solution.

A2: In the case that a wide beam of the first device is used as a transmit beam, a best receive beam of the second device is trained. This may be implemented as follows: The first device sends a third reference signal to the second device based on the wide beam of the first device, where the third reference signal is used to determine the first set beam of the second device, and a signal quality of the third reference signal obtained by the second device based on the first set beam is the best.

Optionally, the third reference signal may be implemented by the beam sweep frame shown in FIG. 6a. A beam ID in the beam sweep frame used as the third reference signal is used to identify the wide beam of the first device.

Optionally, the first device may periodically send the third reference signal to the second device, and then the second device selects one beam each time to receive the third reference signal, and records a signal quality of the third reference signal obtained each time. An embodiment of this application provides a selection strategy as follows: Assuming that a total number of beams on the second device is M, the M beams may be divided into m beam ranges, where M is greater than 1, m is greater than 1, and m is less than M; and both m and M are positive integers. Optionally, a number of beams in each beam range is the same or similar. The second device periodically obtains the third reference signal from the first device, and selects an $i^{th}$ beam to receive the third reference signal obtained for the $i^{th}$ time. When i is less than or equal to m, the $i^{th}$ beam belongs to one of the m beam ranges. For example, m is 2, the first beam belongs to one of the two beam ranges, and the second beam belongs to the other of the two beam ranges. When i is greater than m, the $i^{th}$ beam belongs to a first beam range, a signal quality corresponding to the first beam range is the best among the m beam ranges. A signal quality corresponding to any one of the m beam ranges is related to a signal quality of the third reference signal obtained by the second device based on at least one beam in the beam range. Based on the foregoing selection strategy, there is no need to sequentially traverse and sweep all the beams of the second device, and the first set beam can be selected within a limited number (M) of times, which helps to quickly achieve beam alignment.

Then, based on the foregoing selection strategy, the second device periodically obtains the third reference signal from the first device, and can determine a fourth candidate beam set. An $i^{th}$ beam in the fourth candidate beam set is determined based on the third reference signal obtained for the $i^{th}$ time, i being a positive integer. The fourth candidate beam set includes the first set beam. In addition, the fourth candidate beam set further includes a signal quality of a received third reference signal corresponding to each beam, and the signal quality is indicated by SNR data.

Optionally, the parameter m in the corresponding selection strategy is 2, that is, the M beams of the second device are divided into a beam range 1 and a beam range 2. Beams included in the fourth candidate beam set may be determined by constructing a binary tree. A root node of the binary tree structure has no practical meaning, and each of the remaining tree nodes indicates one beam. Specifically, each tree node may represent a beam ID. Alternatively, the M beams of the second device are mapped to a [0, 1] interval, each beam corresponds to one sub-interval of the [0, 1] interval, and one tree node corresponds to a range in the [0, 1] interval. A value is randomly selected from the range, and if the value falls in a sub-interval corresponding to a beam, the tree node indicates the beam. In an optional implementation, a parent node in the binary tree is connected to a maximum of two child nodes. Taking the second device including 16 beams with beam IDs ranging from 0 to 15 as an example, the construction of a binary tree with beam IDs as tree nodes to determine the beams in the fourth candidate beam set is described in detail below.

Figure 9:
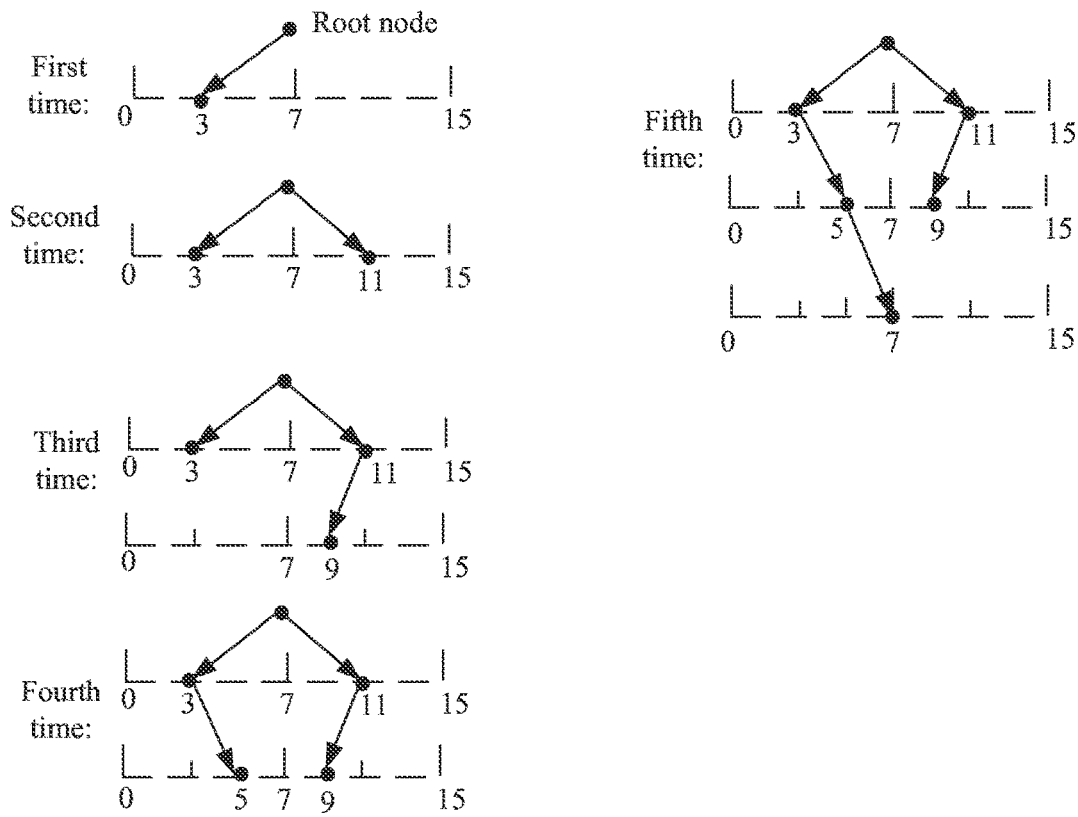
FIG. 9 is a schematic diagram 2 of a candidate beam set establishment procedure according to an embodiment of this application.

FIG. 9 is a schematic diagram of a candidate beam set establishment procedure. In this process, the first device is set to periodically send a third reference signal on a wide beam. For the first time, the second device may select any beam from a beam range 1 indicated by beam IDs 0 to 7, for example, select a beam 3 (that is, a beam whose beam ID is 3, and other descriptions below are similar) to obtain a third reference signal, record that the first beam in the fourth candidate beam set is the beam 3, and record SNR data, R1, corresponding to the beam 3. For the second time, the second device may select any beam from a beam range 2 indicated by beam IDs 8 to 15, for example, select a beam 11 to obtain a third reference signal, record that the second beam in the fourth candidate beam set is the beam 11, and record SNR data, R2, corresponding to the beam 11.

After the first two times of selection, a signal quality corresponding to the beam range 1 may be represented by R1, and a signal quality corresponding to the beam range 2 may be represented by R2. Assuming that the signal quality corresponding to the beam range 1 is weaker than that corresponding to the beam range 2, the second device may select any beam from an interval of a beam 8 to a beam 10 or any beam from an interval of a beam 12 to a beam 15 for the third time, for example, select a beam 9 to obtain a third reference signal, record that the third beam in the fourth candidate beam set is the beam 9, and record SNR data, R3, corresponding to the beam 9. After the third time of selection, the signal quality corresponding to the beam range 1 remains unchanged, and the signal quality corresponding to the beam range 2 is determined by R2 and R3. Assuming that the signal quality corresponding to the beam range 1 is stronger than that corresponding to the beam range 2 after the third time of selection, the second device may select any beam from the interval of the beam 0 to a beam 2 or any beam from the interval of a beam 4 to the beam 7 for the fourth time, for example, select a beam 5 to obtain a third reference signal, record that the fourth beam in the fourth candidate beam set is the beam 5, and record SNR data, R4, corresponding to the beam 5. After the fourth time of selection, the signal quality corresponding to the beam range 1 is determined by R1 and R4, and the signal quality corresponding to the beam range 2 is determined by R2 and R3. Assuming that the signal quality corresponding to the beam range 1 is stronger than that corresponding to the beam range 2 after the fourth time of selection, the second device may select a beam 4 or any beam from the interval of a beam 6 to the beam 7 for the fifth time, for example, select the beam 7 to obtain a third reference signal, record that the fifth beam in the first candidate beam set is the beam 7, and record SNR data, R5, corresponding to the beam 7. After the fifth time of selection, the signal quality corresponding to the beam range 1 is determined by R1, R4, and R5, and the signal quality corresponding to the beam range 2 is determined by R2 and R3. By analogy, the signal quality corresponding to the beam range 1 and the signal quality corresponding to the beam range 2 are continuously updated and compared, to determine a next node until the tree depth reaches a maximum depth, and the establishment of the candidate beam set is completed. A beam represented by the last determined node may be considered as the first set beam in the fourth candidate beam set. As an illustration, FIG. 9 shows a process of selecting beams for the foregoing five times, which ends with the beam 7 selected for the fifth time. Finally, the fourth candidate beam set includes the beam 3, the beam 11, the beam 9, the beam 5, and the beam 7. The beam 7 is the foregoing first set beam, and the SNR data R5 corresponding to the beam 7 indicates that a signal quality of the obtained third reference signal is the best.

Optionally, in one manner, a number of repetitions for the first device to periodically send the third reference signal may depend on the number M of beams included in the second device. To be specific, the first device sends the third reference signal M times based on the wide beam, and when the third reference signal is implemented by a beam sweep frame, a value of RBeam in a beam sweep frame sent for the $i^{th}$ time is M-i. In another manner, it may be assumed that when the third reference signal has been periodically obtained for a third duration, the second device may estimate a number of beams that may further need to be determined for the fourth candidate beam, so as to indicate whether the first device subsequently needs to send the third reference signal and a remaining number of repetitions if the third reference signal subsequently needs to be sent. The third duration herein may be predefined, and the second device receives the third reference signal less than M times in the third duration. For the foregoing another manner, an embodiment of this application provides an implementation executed by the second device, which is as follows.

In one possible case, when the second device has periodically obtained the third reference signal for the third duration, beams that have been determined in the fourth candidate beam set do not include the first set beam. Then the second device sends third indication information to the first device. The third indication information is used to indicate the remaining number of repetitions for the first device to send the third reference signal. The remaining number of repetitions is related to a beam range in which the beams that have been determined in the fourth candidate beam set are distributed.

Optionally, in this case, when the third duration is reached, the second device may send the sweep insertion frame shown in FIG. 8 to the first device, to indicate the remaining number of repetitions for the first device to send the third reference signal. In other words, the third indication information may be implemented by the TRN Num in the sweep insertion frame.

Optionally, the remaining number of repetitions indicated by the third indication information may be determined using the following method:

The M beam IDs of the second device are mapped to the [0, 1] interval. The fourth candidate beam set is determined by constructing a binary tree. A maximum tree depth may be determined by a range represented by the deepest node. For example, the range is set to C/M. C<1 and is a given constant to control the precision. The smaller the value, the higher the precision. M is a number of available beams, and the maximum tree depth $$D = \left\lceil \log_2 \frac{M}{C} \right\rceil$$

can be obtained. It may be assumed that when the second device obtains a beam sweep frame (the third reference signal) for the $T^{th}$ time, where $$T = \left\lceil \frac{1}{\varepsilon} \sqrt{M \log_2 M} \right\rceil,$$

that is, the third duration is reached, the beam sweep insertion frame is sent to the first device. E is the golden ratio of 0.618, which is a reference value considering the complexity of the algorithm. If the tree depth d<⌈$\log_2 M$⌉ when the third duration is reached, it indicates that an SMR curve measured multiple times in the third duration does not satisfy a weak Lipschitz (weak Lipschitz) condition, that is, there is a sudden change in the curve. According to procedures of the algorithm, the complete binary tree needs to be traversed, and all the beam IDs of the second device need to be traversed, so that the remaining number of repetitions indicated by the third indication information can be determined as T'=M−T. Conversely, if the tree depth d≥⌈$\log_2 M$⌉ when the third duration is reached, it indicates that an optimal value has been nearly reached, and the remaining reachable tree depth is R=D−d. Optionally, the remaining number of repetitions indicated by the third indication information may be determined based on R and the number of beams that have been determined in the fourth candidate beam set. For example, the first device may be indicated to send $2^R$ beam sweep frames after obtaining the beam sweep insertion frame.

In another possible case, when the second device has periodically obtained the third reference signal for the third duration, the beams that have been determined in the fourth candidate beam set include the first set beam. Then the second device may indicate the first device to stop sending the third reference signal. Optionally, based on the phase type (Phase Type) in the beam sweep feedback frame shown in FIG. 6b, the second device may send a beam sweep feedback frame to the first device to indicate the first device to stop sending the third reference signal. Specifically, the value of the phase type in the beam sweep feedback frame sent by the second device in this case may be 1, indicating the first device to end training the best receive beam of the second device, that is, stop sending the third reference signal, and prepare to enter the subsequent beam combination update phase.

Further optionally, to avoid local optimum extremity, in one manner, it may be assumed that when i is greater than m, if the number of times beam ranges with the best signal quality that are consecutively determined are the same exceeds a set threshold, a beam to receive the fourth reference signal is not to be selected the next time from the beam range corresponding to the best signal quality, but a beam is selected from another beam range. In another manner, due to impact such as noise, the beam combination build may be considered as a random bandits problem. The local optimum extremity can be avoided based on a hierarchical optimistic optimization (Hierarchical Optimistic Optimization, HOO) algorithm in reinforcement learning. The HOO algorithm may also be considered as a Monte-Carlo tree search algorithm. As a non-gradient optimization algorithm, the HOO algorithm improves an upper bound of confidence interval (upper confidence bound, UCB) by constructing a tree structure, and then obtains an optimistic sampling strategy. The core idea of the algorithm is to make a detailed estimation on an interval with large returns and a loose estimation on other parts based on accumulated average returns, so as to reduce the total number of explorations and quickly converge to a globally optimal solution.

Figure 10:
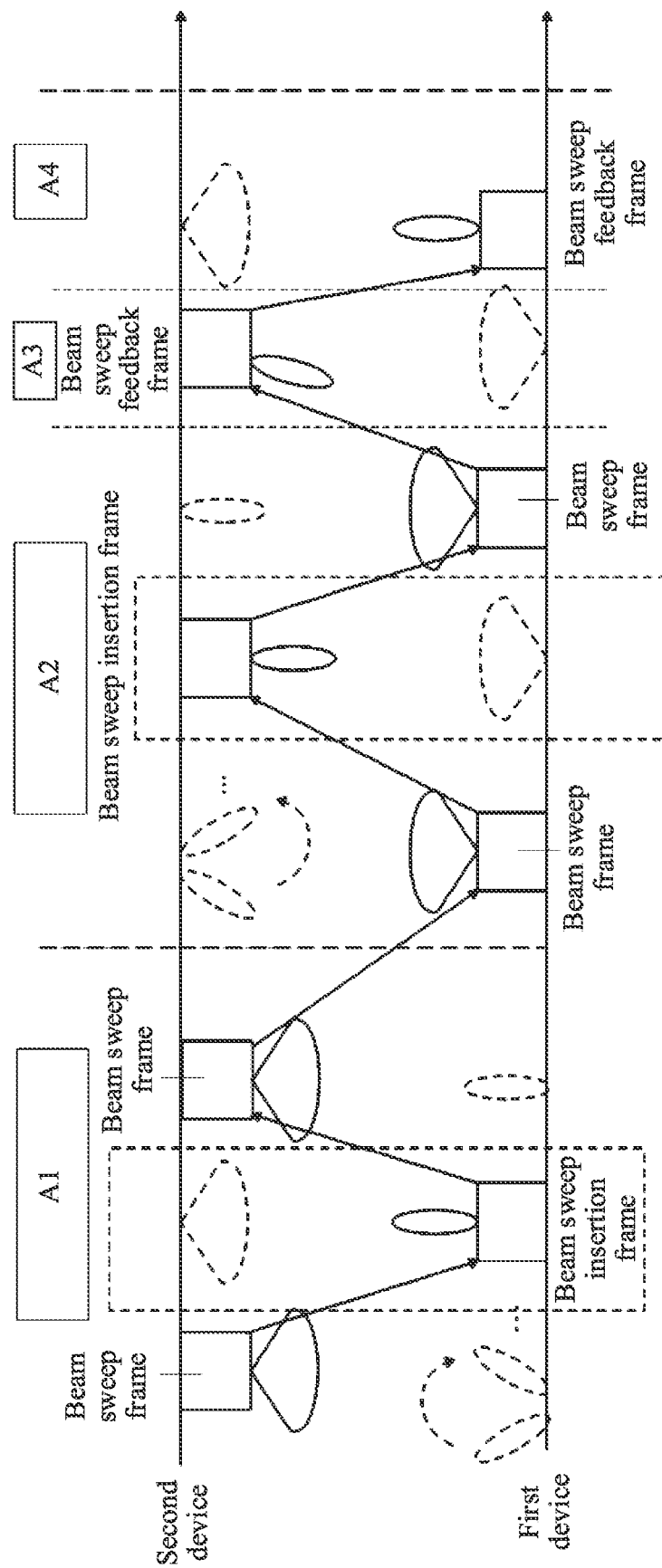
FIG. 10 is a schematic diagram of a beam combination build procedure according to an embodiment of this application.

Based on the implementations of the foregoing processes A1 and A2, FIG. 10 is a schematic diagram of a procedure of a beam combination build phase according to an embodiment of this application. A solid line indicates sending, and a dashed line indicates receiving. As shown, in the foregoing process A1, the second device periodically sends the beam sweep frame to the first device based on the wide beam; the first device determines one beam in the first candidate beam set each time the first device obtains the beam sweep frame; the first device sends the beam sweep insertion frame to the second device when the first device has periodically obtained the beam sweep frame for the first duration; and based on the remaining number of transmissions indicated by the obtained beam sweep insertion frame, the second device continues to send the beam sweep frame until the first device determines the best receive beam, that is, the first beam. The receive end and the transmit end are switched. In the foregoing process A2, the first device periodically sends the beam sweep frame to the second device based on the wide beam; the second device determines one beam in the fourth candidate beam set each time the second device obtains the beam sweep frame; the second device sends the beam sweep insertion frame to the first device midway (that is, when the second device has periodically obtained the SSW for the third duration); and based on the remaining number of transmissions indicated by the obtained beam sweep insertion frame, the first device continues to send the beam sweep frame until the second device determines the best receive beam, that is, the first set beam.

After the processes A1 and A2, a process A3 and a process A4 are also illustrated. The process A3 is a process in which the second device feeds back the first set beam and the SNR data corresponding to the first set beam to the first device. Specifically, the second device sends the beam sweep feedback frame to the first device. In the SSW-FB1, the selected beam ID is used to identify the first set beam, and the signal quality fed back by the RSS/SNR report is the signal quality of the third reference signal obtained by the second device based on the first set beam. The process A4 is a process in which the first device feeds back the third beam and the SNR data corresponding to the third beam to the second device. Specifically, the first device sends the beam sweep feedback frame to the second device. In the SSW-FB2, the selected beam ID is used to identify the first beam, and the signal quality fed back by the RSS/SNR report is the signal quality of the fourth reference signal obtained by the first device based on the third beam.

The beam combination update phase mentioned in this solution is described in detail below. This phase mainly includes the following process B1 and process B2.

Process B1: updating the best receive beam on the side of the first device, which mainly includes the following steps S11 to S14.

S11: The second device sends a first reference signal to the first device based on the first set beam determined in the process A2, and the first device receives the first reference signal based on the best receive beam, namely, the third beam, determined in the foregoing process A1.

S12: The first device compares a signal quality of the first reference signal obtained by the first device based on the third beam with that of the fourth reference signal obtained by the first device based on the third beam, to determine a first comparison result.

For example, the signal quality is indicated by SNR data. The signal quality of the first reference signal obtained by the first device based on the third beam is denoted as $R_1$, and the signal quality of the fourth reference signal obtained by the first device based on the third beam is denoted as $R_1'$. The first comparison result may be represented by a variation of $R_1$ relative to $R_1'$. For example, the first comparison result is expressed as $$\delta = \frac{|R_1' - R_1|}{R_1}.$$

The beams included in the first candidate beam set determined in the process A1 may be updated based on the magnitude of the variation.

Optionally, performing the update only when the variation exceeds a set threshold may be set. Different variations correspond to different numbers of beams that need to be updated in the first candidate beam set. Alternatively, if the first candidate beam set is formed by constructing a binary tree, a pruning algorithm may be used to adaptively select beam IDs to be updated, so as to update the tree structure. In this process, based on the foregoing variation, the first device may determine that a pruning depth is denoted as j, and that $j=\min\{\lfloor \alpha D * \delta \rfloor, D\}$, where D is a maximum depth of the tree, $0<\alpha \leq 1$ is a given hyperparameter. For example, when $\alpha=1$, it indicates that when $R_1$ is different from $R_1'$ by two times, that is, $\delta=1$, the entire tree needs to be pruned, and a tree needs to be reconstructed to measure all beams.

S13: The first device sends sending second indication information to the second device based on the first comparison result, where the second indication information is used to indicate the second device to send the first reference signal p times, p being a positive integer.

Optionally, a value of p is related to the variation indicated by the foregoing first comparison result. A larger variation indicates a larger value of p. In an simplementation, a correspondence between the variation and the value of p may be set in a predefined manner, so as to determine the value of p. Alternatively, optionally, the value of p may be determined by the pruning depth j. For example, when the pruning depth j is determined, p may be set to $2^j$. Alternatively, optionally, the value of p may be determined by a number of available beams in a beam ID interval to which an upper-layer tree node of a pruned tree node belongs. Assuming that the pruning depth is small, it can be traced back to x tree nodes at an upper layer (x is a natural number less than the depth of the entire tree and may be 2), a number of available beams in an interval of the upper-layer tree node may be determined, and then the available beam IDs in the interval are fed back to the second device, or the number of available beams in the interval is fed back to the second device.

The second indication information may be implemented by the TRN Num in the foregoing beam sweep insertion frame shown in FIG. 8, and a value of the TRN Num is p.

This step illustrates a case that the foregoing variation indicated by the first comparison result exceeds the set threshold. If the foregoing variation indicated by the first comparison result does not exceed the set threshold, the subsequent update is not performed, that is, S13 and S14 are not performed, and the first device may continue to obtain a relevant signal sent by the second device, based on the best receive beam determined in A1, namely, the third beam.

S14: The first device obtains the first reference signal sent by the second device p times, updates the first candidate beam set determined in the process A1 to obtain a second candidate beam set, where the second candidate beam set includes the first beam, and the signal quality of the first reference signal obtained by the first device based on the first beam is greater than that of the first reference signal obtained by the first device based on the third beam. The first beam replaces the third beam as the best receive beam of the first device.

Optionally, the first candidate beam set is determined in a binary tree manner based on the process A1. The first device may select nodes in the tree corresponding to the first candidate beam set from bottom to top through step S12, and perform pruning. Then for the tree subjected to the pruning, a tree structure update operation may start from an upper-layer node after the pruning operation, instead of starting from the root node every time. The first device continues to search for the remaining nodes to generate the second candidate beam set. Some of the beams in the second candidate beam set and the first candidate beam set are the same.

Figure 11A:
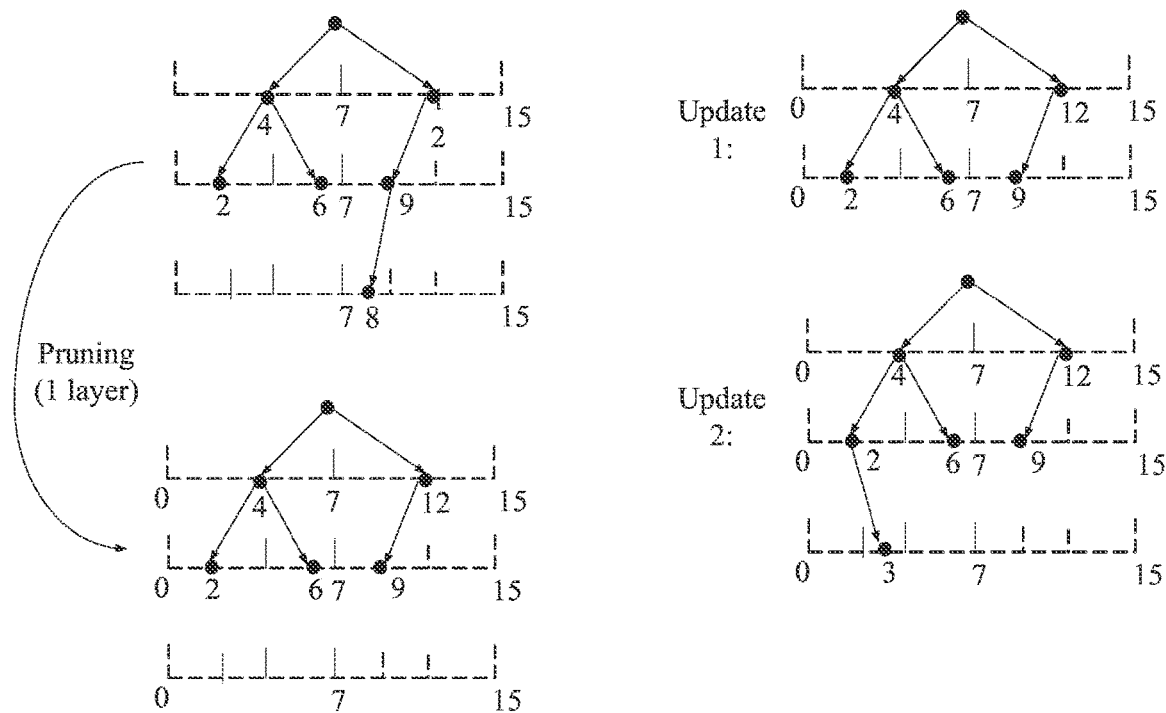
FIG. 11a is a schematic diagram 1 of a candidate beam set update procedure according to an embodiment of this application.

For example, FIG. 11a is a schematic diagram of a candidate beam set update procedure. It is assumed that the candidate beam set formed in FIG. 7 is subjected to pruning and that a pruning depth is 1 layer. The beam 8 in the first candidate beam set is pruned, and it is traced back to an upper-layer node, namely, the beam 9, after the pruning operation, to perform the first update: determining a signal quality of the first reference signal obtained based on the beam 9, and updating the SNR data corresponding to the beam 9 to R5'. Then the signal quality corresponding to the beam range 1 is still determined by R1, R3, and R4, while the signal quality corresponding to the beam range 2 is determined by R2 and R5'. Assuming that the signal quality corresponding to the beam range 1 is stronger than that corresponding to the beam range 2 at this time, it is traced back to the beam 2 determined for the previous time (the fourth time in FIG. 7), to perform the second update: selecting one beam from the beam 0, the beam 1, or the beam 3 using the beam 2 as a parent node and with reference to the original tree structure. Assuming that the beam 3 is selected to obtain the first reference signal, SNR data corresponding to the beam 3 is denoted as R6', and then the signal quality corresponding to the beam range 1 is still determined by R1, R3, R4, and R6', while the signal quality corresponding to the beam range 2 is determined by R2 and R5'. If the signal quality corresponding to the beam range 1 is stronger than that corresponding to the beam range 2 at this time, the beam 3 is determined as the first beam, thereby completing the update of the first candidate beam set, and generating a second candidate beam set shown in FIG. 11a.

Further optionally, the second candidate beam set may further be iteratively updated multiple times with reference to the foregoing implementations of S11 to S14, and a convergence condition is that a variation obtained by comparing signal qualities corresponding to the first beam is determined to be relatively small two or more times. Then a previously determined first beam is determined as the best receive beam of the first device trained in the beam combination update phase.

Process B2: updating the best receive beam on the side of the second device, which mainly includes the following steps S21 to S24.

S21: The first device sends a second reference signal to the second device based on the first beam determined in the process B1, and the second device receives the second reference signal based on the first set beam determined in the process A1.

S22: The second device compares a signal quality of the second reference signal obtained by the second device based on the first set beam with that of the first reference signal obtained by the first device based on the first beam, to determine a third comparison result.

For example, the signal quality is indicated by SNR data. The signal quality of the first reference signal obtained by the first device based on the third beam is denoted as $R_3$, and the signal quality of the fourth reference signal obtained by the first device based on the third beam is denoted as $R_3'$. The first comparison result may be represented by a variation of $R_3$ relative to $R_3'$. For example, the first comparison result is expressed as $$\delta = \frac{|R_3' - R_3|}{R_3}.$$

The beams included in the fourth candidate beam set determined in the process A2 may be updated based on the magnitude of the variation.

If the fourth candidate beam set is formed by constructing a binary tree, a pruning algorithm may be used to adaptively select beam IDs to be updated, so as to update the tree structure. Specifically, in this process, based on the foregoing variation, the second device may determine that a pruning depth is denoted as j, and that $j \min\{\lfloor \alpha D * \delta \rfloor, D\}$, where D is a maximum depth of the tree, $0 < \alpha \leq 1$ is a given hyperparameter. For example, when $\alpha=1$, it indicates that when $R_3$ is different from $R_3'$ two times, that is, $\delta=1$, the entire tree needs to be pruned, and a tree needs to be reconstructed to measure all beams.

S23: The second device sends fourth indication information to the first device based on the third comparison result, where the fourth indication information is used to indicate the first device to send the second reference signal p times, p being a positive integer.

Optionally, a value of p in this step is related to the variation indicated by the foregoing third comparison result. A larger variation indicates a larger value of p. In an implementation, a correspondence between the variation and the value of p may be set in a predefined manner, so as to determine the value of p. Alternatively, optionally, the value of p may be determined by the pruning depth j. For example, when the pruning depth j is determined, p may be set to $2^j$. Alternatively, optionally, the value of p may be determined by a number of available beams in a beam ID interval to which an upper-layer tree node of a pruned tree node belongs. Assuming that the pruning depth is small, it can be traced back to x tree nodes at an upper layer (x is a natural number less than the depth of the entire tree and may be 2), a number of available beams in an interval of the upper-layer tree node may be determined, and then the available beam IDs in the interval are fed back to the second device, or the number of available beams in the interval is fed back to the second device. It should be noted that depending on an actual situation, the value of p in S23 may be the same as or different from that of p in S13.

The fourth indication information may be f implemented by the TRN Num in the foregoing beam sweep insertion frame shown in FIG. 8, and a value of the TRN Num is p.

In this step, the foregoing variation indicated by the third comparison result is not 0. In addition, it should be noted that when the foregoing variation indicated by the third comparison result is 0, the subsequent update is not performed, that is, S23 and S24 are not performed, and the second device may continue to send or receive a relevant signal based on the best receive beam determined in A2, namely, the first set beam.

S24: The second device obtains the second reference signal sent by the second device p times, and updates the fourth candidate beam set to obtain a fifth candidate beam set, where the fifth candidate beam set includes the second beam.

Optionally, the fourth candidate beam set is determined in a binary tree manner based on the process A2. The second device may select nodes in the tree corresponding to the fourth candidate beam set from bottom to top through step S22, and perform pruning. Then for the tree subjected to the pruning, a tree structure update operation may start from an upper-layer node after the pruning operation, instead of starting from the root node every time. The second device continues to search for the remaining nodes to generate the fifth candidate beam set. For example, the generation of the fifth candidate beam set stops once the second beam is found. Some of the beams in the fifth candidate beam set and the fourth candidate beam set are the same.

Figure 11B:
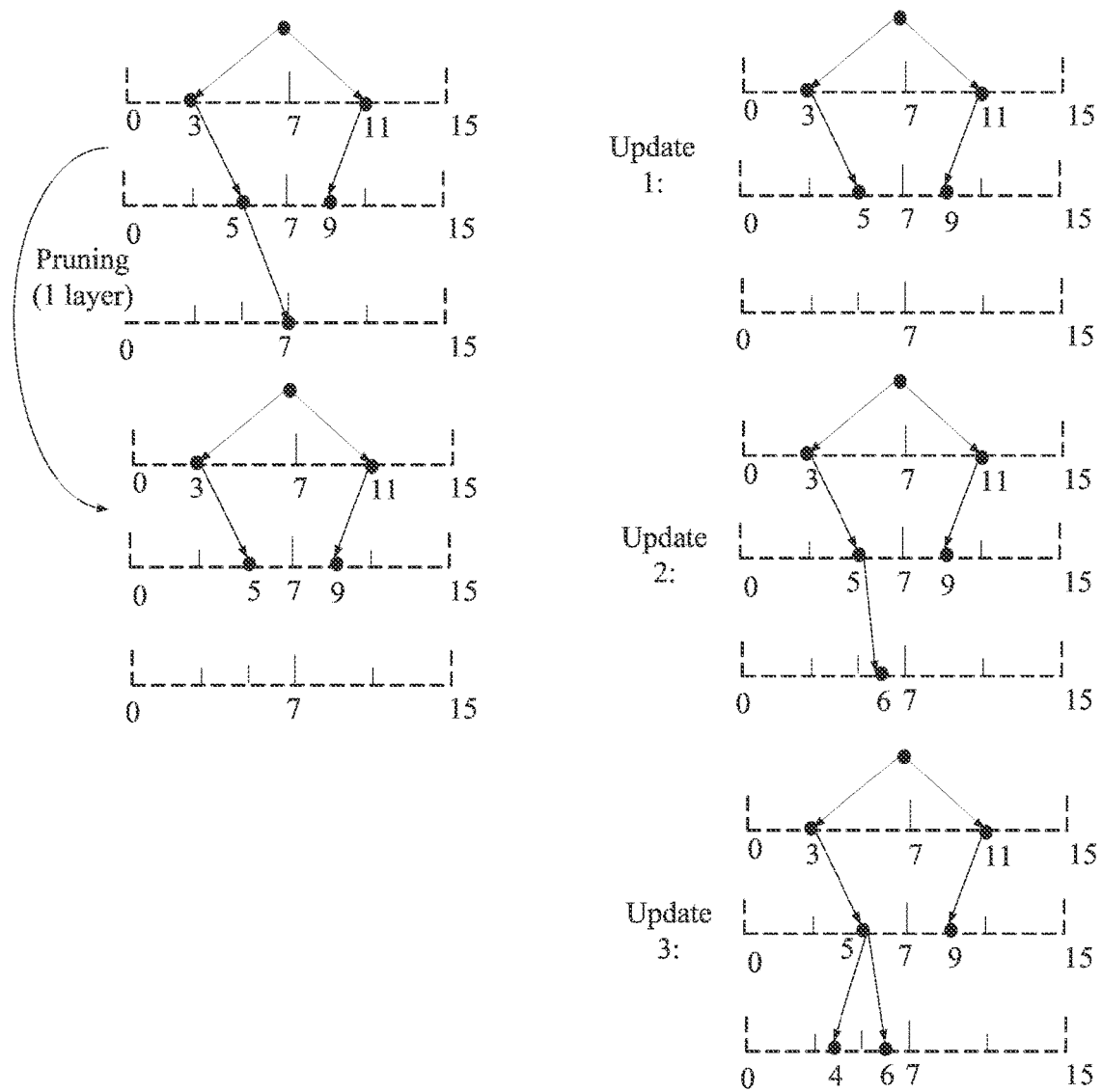
FIG. 11b is a schematic diagram 1 of a candidate beam set update procedure according to an embodiment of this application.

For example, FIG. 11b is a schematic diagram of a candidate beam set update procedure. It is assumed that the fourth candidate beam set formed in FIG. 9 is subjected to pruning and that a pruning depth is 1 layer. The beam 7 in the first candidate beam set is pruned, and it is traced back to an upper-layer node, namely, the beam 5, after the pruning operation, to perform the first update: determining a signal quality of the second reference signal obtained based on the beam 5, and updating the SNR data corresponding to the beam 5 to R4'. Then the signal quality corresponding to the beam range 1 is determined by R1 and R4', while the signal quality corresponding to the beam range 2 is determined by R2 and R3. Assuming that the signal quality corresponding to the beam range 1 is stronger than that corresponding to the beam range 2 at this time, the second update is performed: selecting one beam from the beam 4, the beam 6, or the beam 7 using the beam 5 as a parent node and with reference to the original tree structure. Assuming that the beam 7 is selected to obtain the second reference signal, SNR data corresponding to the beam 7 is denoted as R5. If a difference between the signal quality of the second reference signal obtained based on the beam 7 and the signal quality of the first reference signal obtained by the first device based on the first beam exceeds a set threshold, or the two are different, or the two are not similar, the third update continues to be performed: selecting one beam from the beam 4 or the beam 6 using the beam 5 as a parent node and with reference to the original tree structure. Assuming that the beam 4 is selected to obtain the second reference signal, SNR data corresponding to the beam 4 is denoted as R6. Assuming that a difference between the signal quality of the second reference signal obtained based on the beam 4 and the signal quality of the first reference signal obtained by the first device based on the first beam is less than the set threshold, or the two are the same, or the two are similar, the beam 4 is determined as the second beam, thereby completing the update of the fourth candidate beam set, and generating a fifth candidate beam set shown in FIG. 11b. In addition, it should be noted that FIG. 11b is merely an example of the beam combination update on the side of the first device in the process B2. In an implementation, if the second beam is still not determined at the maximum tree depth, a new pruning strategy may be formulated. For example, the pruning depth is to be increased, and another update is to be performed.

The foregoing implementation of the beam combination update phase can be analogous to finding extreme solutions on a curved surface using a hill-climbing algorithm. This greedy algorithm reduces traversal operations, greatly reduces the computational complexity, and quickly achieves beam alignment.

Figure 12:
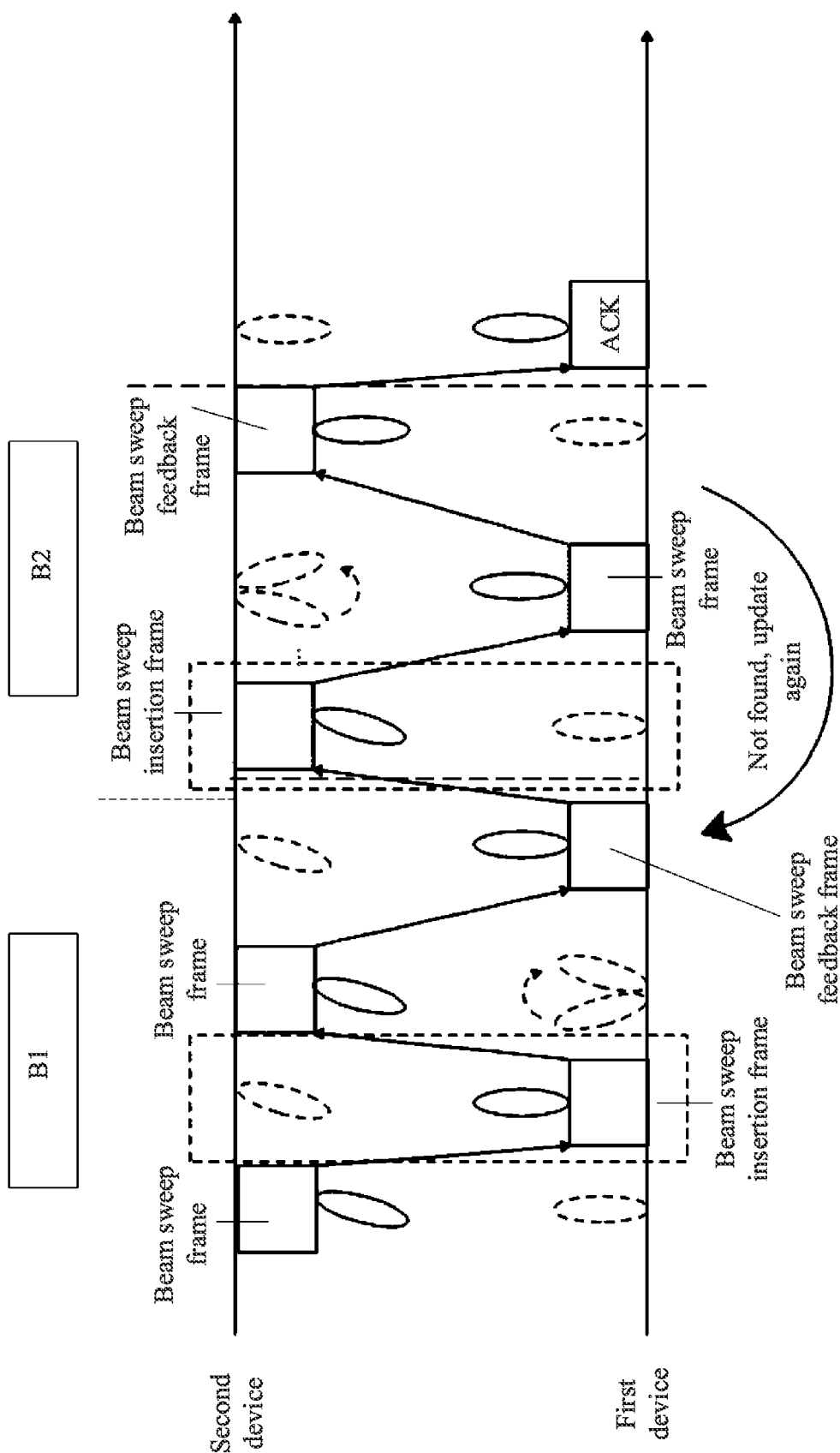
FIG. 12 is a schematic diagram of a beam combination update procedure according to an embodiment of this application.

Based on the implementations of the foregoing processes B1 and B2, FIG. 12 is a schematic diagram of a procedure of a beam combination update phase according to an embodiment of this application. A solid line indicates sending, and a dashed line indicates receiving. As shown, in the foregoing process B1, the second device sends a beam sweep frame (corresponding to the first reference signal) based on the first set beam; the first device sends a beam sweep insertion frame to the second device to indicate the number of times for which the second device sends the foregoing beam sweep frame; and the first device sends the beam sweep feedback frame to the second device to feed back the SNR corresponding to the determined first beam to the second device. In addition, as shown, in the foregoing process B2, the first device sends a beam sweep frame (the first reference signal) to the second device; the second device sends a beam sweep insertion frame to the first device to indicate the number of times for which the first device sends the foregoing beam sweep frame; and the second device sends a beam sweep feedback frame to the first device to indicate that the second device has determined the second beam. Optionally, FIG. 12 further shows a situation in which the second device does not find the second beam and updates again. In addition, FIG. 12 further shows that after receiving the beam sweep feedback frame, the first device sends an ACK to the second device as a response to the beam sweep feedback frame sent by the second device in the process B2. For example, the ACK indicates that the first device learns that the second device has determined the second beam.

In this solution 1, a wide beam is used as a transmit beam, a tree structure is constructed to train a best receive narrow beam, and related channel environment information, such as a received signal quality, corresponding to a beam indicated by a tree node is recorded. Based on the tree structure, a priori knowledge can be established, and the search complexity can be reduced, so that beam alignment is quickly achieved, providing a corresponding reference for the subsequent beam tracking.

In addition, in terms of description, the foregoing solution 1 provided in this embodiment of this application may be understood as a combined wide and narrow beam alignment solution. The time computation of this solution 1 mainly depends on the switching of the transmit end and the receive end, or a time for switching beam transmission and reception and a time for constructing a candidate beam set, for example, establishing a tree structure. It is assumed that a beam switching time is T and that T depends on hardware. A time for establishing a tree node is t, and t depends on the internal implementation of software. A total number of beams of a device is N. Then a total time of the beam combination build phase is $O((t+T)\sqrt{N\log N})$.

Solution 2: Beam alignment between the first device and the second device may be implemented by selecting an optimal round from multiple rounds of narrow beam alignment. Specifically, each round of narrow beam alignment may include a beam combination build phase and a beam combination update phase. For example, the second device serves as an initiator, and the first device serves as a recipient. A beam combination build phase in one round includes the following: In the case that the second device randomly selects a beam as a transmit beam, a best receive beam of the first device is trained; and then the receive end and the transmit end are switched, and a best receive beam of the second device is trained by using the foregoing best receive beam as a transmit beam. The foregoing first set beam of the second device may be the best receive beam of the second device determined in this phase. In the beam combination update phase, after best receive beams at both ends are determined in the beam combination build phase, adjustment and update are performed, to achieve the current round of beam alignment between the first device and the second device by training. Beams randomly selected by the second device in different rounds are different. Optionally, an available range of randomly selected beams may be all the beams of the second device, or may be a predefined range. It should be noted that the division of the beam combination build phase and the beam combination update phase is only for the convenience of understanding this solution. In actual application, the phases may not be obtained according to this division, but may be obtained according to other divisions, or even no phase division is performed, which is not limited in the embodiments of this application.

An implementation of a round of narrow beam alignment is described below by using the foregoing process in which the first device determines the first beam and the second device determines the second beam.

The beam combination build phase mainly includes the following process C1 and process C2. In this round, a beam randomly selected by the second device is denoted as a first initialization beam.

Process C1: Training the best receive beam of the first device in the case that the second device uses the first initialization beam as a transmit beam. This process may be similar to the signaling interaction of the process A1: The second device sends a fourth reference signal to the first device based on the first initialization beam, where the fourth reference signal is used to determine a third beam of the first device, and a signal quality of the fourth reference signal obtained by the first device based on the third beam is the best. The third beam is the best receive beam of the first device in the beam combination build phase. Different from the process A1, in this process, when the fourth reference signal is implemented by a beam sweep frame, a beam ID in the beam sweep frame is used to identify the first initialization beam. In addition, the process C1 further includes a process similar to A3, that is, the first device sends a beam sweep feedback frame to the second device, so as to feed back the determined third beam to the second device.

Optionally, a solution for determining the third beam may be first implemented according to the foregoing process A1, for example, constructing a binary tree to search for the third beam. Details are not described in this embodiment of this application.

Process C2: Training the best receive beam of the second device in the case that the first device uses the third beam as a transmit beam. Specifically, refer to the process A1 or C1 for implementation, except that the transmit end and the receive end are switched. The first device sends a third reference signal to the second device based on the foregoing third beam, where the third reference signal is used to determine the first set beam of the second device, and a signal quality of the third reference signal obtained by the second device based on the first set beam is the best. The first set beam is the best receive beam of the second device in the beam combination build phase. In this process, when the third reference signal is implemented by a beam sweep frame, a beam ID in the beam sweep frame is used to identify the third beam. In addition, the process C2 further includes a process similar to A4, that is, the second device sends a beam sweep feedback frame to the first device, so as to feed back the determined first set beam to the second device.

Optionally, a solution for determining the first set beam may be first implemented according to the foregoing process A2, for example, constructing a binary tree to search for the first set beam. Details are not described in this embodiment of this application.

In this solution, the foregoing first set beam is determined based on the processes C1 and C2 in the beam combination phase. In the beam combination update phase, refer to the process B1 for implementation of a process of determining the first beam, and refer to the process B2 for implementation of a process of determining the second beam. Details are not described again in this embodiment of this application.

Figure 13:
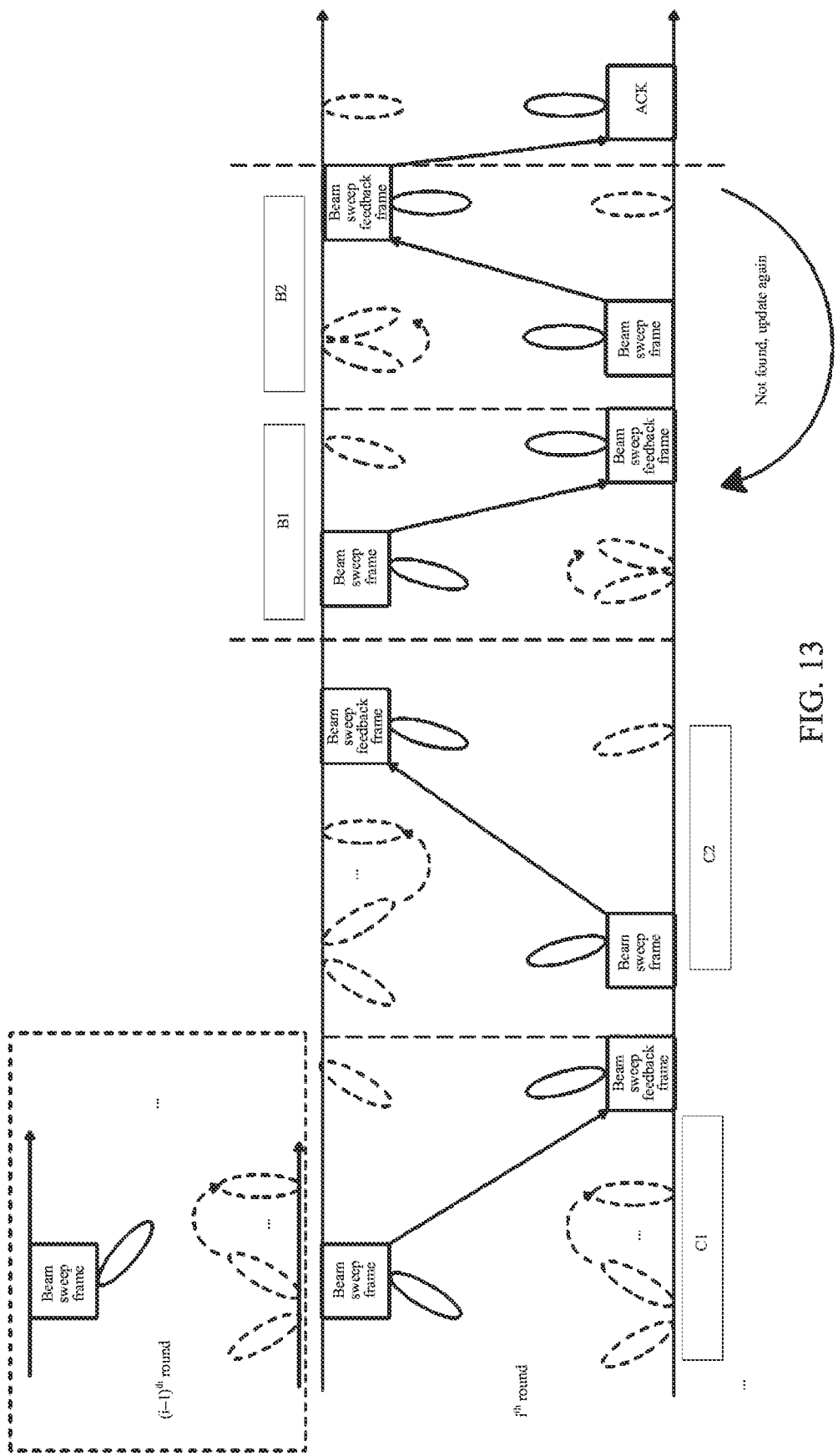
FIG. 13 is a schematic diagram 1 of a beam alignment procedure according to an embodiment of this application.

In addition, it should be noted that although this solution shows only the process of one round of narrow beam alignment training, a process of another round of narrow beam alignment training may be implemented with reference to the solution of this round of narrow beam alignment training, and also falls within the protection scope of this solution. FIG. 13 is a schematic diagram of a beam alignment procedure according to an embodiment of this application, and shows the foregoing processes C1, C2, B1, and B2 in the $i^{th}$ round of narrow beam alignment in a plurality of rounds. The illustration of the beam sweep insertion frame in each process is omitted, which can be explained with reference to the beam sweep frame in FIG. 10 and FIG. 12.

The basis for determining the optimal round is described below by taking the foregoing determining of the first beam and the second beam as the optimal round. The second device sends a fifth reference signal to the first device based on a second set beam, where the fifth reference signal is used by the first device to determine a fifth beam, a signal quality of the fifth reference signal obtained by the first device based on the fifth beam is the best, and a signal quality of the first reference signal obtained by the first device based on the fifth beam is less than that of the first reference signal obtained by the first device based on the first beam. The second set beam is any beam of the second device other than the first beam. For a method of determining the second set beam, refer to the processes C1 and C2. The second device may randomly select the second initialization beam as a transmit beam, and a best receive beam of the first device is trained through the process C1. In the process C2, the foregoing best receive beam of the first device is used as a transmit beam to train the second set beam of the second device.

In this solution 2, different narrow beams are initialized as transmit beams, to perform multiple rounds of beam training, and a best beam combination determined in a round with the best signal quality is used to implement beam alignment. This solution can be applied to beam alignment between devices supporting only narrow beams (for example, short-range VR devices). Compared with a low-power wide beam, a high-power narrow beam can obtain accurate reception direction information more easily.

In addition, the time computation of this solution 2 mainly depends on the switching of the transmit end and the receive end, or a time for switching beam transmission and reception, a time for selecting an initialization beam, and a time for constructing a candidate beam set, for example, establishing a tree structure. It is assumed that a beam switching time is T and that T depends on hardware. A time for establishing a tree node is t, and t depends on the internal implementation of software. The total number of beams of the device is N, and the number of rounds of selecting the initialization beam is C. Then a total time of the beam combination build phase is $O((t+T)C \sqrt{N \log N})$.

Figure 14:
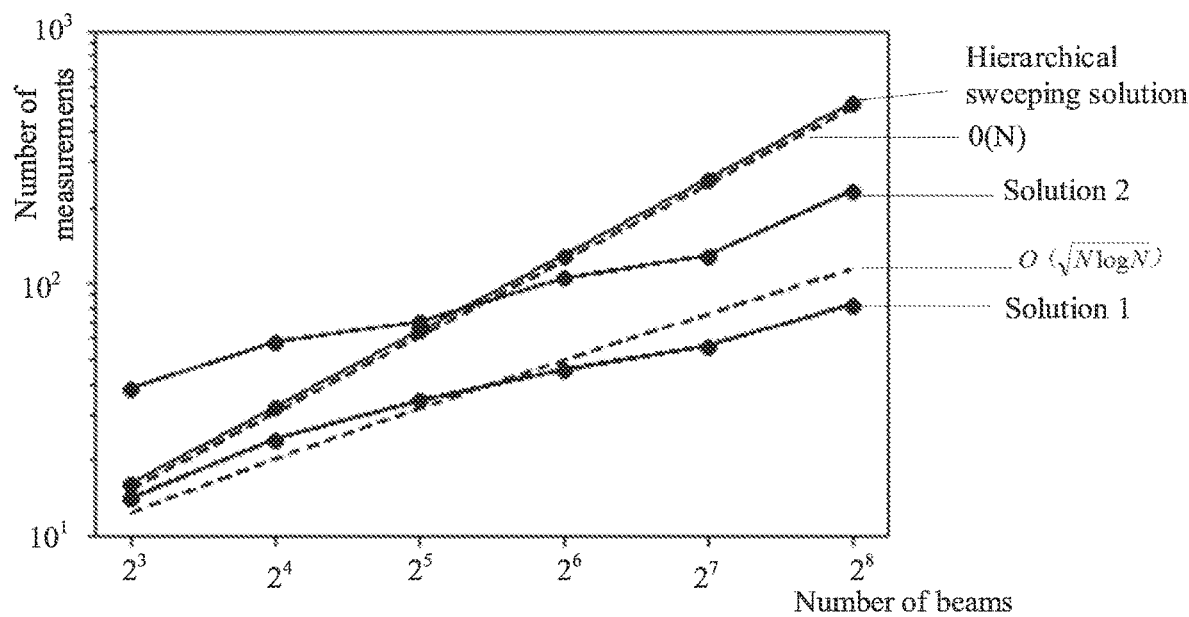
FIG. 14 is a schematic diagram of measurement curves according to an embodiment of this application.

FIG. 14 is a schematic diagram of a measurement curve, which shows advantages of Solution 1 and Solution 2 compared with the hierarchical sweeping solution provided in 802.11ad. The ordinate represents the number of measurements required for obtaining reference signal measured signal quality data such as RSS/SNR data and determining an optimal beam. The abscissa represents the number of beams at the transmit end or the receive end. It can be learned from FIG. 14 that, compared with the hierarchical sweeping solution, Solution 1 and Solution 2 provided in the embodiments of this application can reduce the number of measurements of a signal quality, that is, can quickly achieve beam alignment. In addition, from the perspective of algorithm complexity, Solution 1 and Solution 2 have a lower algorithm complexity than the hierarchical sweeping solution. A set beam is a beam randomly selected by the second device.

Solution 3: The first set beam may be a beam randomly selected by the second device. In an optional implementation, the foregoing step S501 in which the first device obtains the first reference signal from the second device and determines the first beam may be implemented as follows:

The first reference signal from the second device is periodically obtained, and the second candidate beam set is determined. The first reference signal is sent by the second device based on a beam randomly selected by the second device.

Similar to the foregoing method of constructing the first candidate beam set and the fourth candidate beam set, in this solution, an $i^{th}$ beam in the second candidate beam set is determined based on the first reference signal received for the $i^{th}$ time, i being a positive integer. The second candidate beam set includes the first beam. Optionally, the second device may periodically send the first reference signal to the first device, and then the first device selects one beam each time to receive the first reference signal, and records a signal quality of the first reference signal obtained each time. An embodiment of this application provides a selection strategy as follows: Assuming that a total number of beams on the first device is N, the N beams may be divided into n beam ranges, where N is greater than 1, n is greater than 1, and n is less than N; and both n and N are positive integers. Optionally, a number of beams in each beam range is the same or similar. The first device periodically obtains the first reference signal from the second device, and selects an $i^{th}$ beam to receive the first reference signal obtained for the $i^{th}$ time. When i is less than or equal to n, the $i^{th}$ beam belongs to one of the n beam ranges. For example, n is 2, the first beam belongs to one of the two beam ranges, and the second beam belongs to the other of the two beam ranges. When i is greater than n, the $i^{th}$ beam belongs to a second beam range, a signal quality corresponding to the second beam range is the best among the n beam ranges. A signal quality corresponding to any one of the n beam ranges is related to a signal quality of the fourth reference signal obtained by the first device based on at least one beam in the beam range. Based on the foregoing selection strategy, there is no need to sequentially traverse and sweep all the beams of the second device, and the third beam can be selected within a limited number (N) of times, which helps to quickly achieve beam alignment.

Further, in the process of determining the second candidate beam set, the method further includes: when the first device has periodically obtained the first reference signal for a second duration, if beams that have been determined in the second candidate beam set do not include the first beam, sending fifth indication information to the second device, where the fifth indication information is used to indicate a remaining number of repetitions for the second device to send the first reference signal; or when the first device has periodically obtained the first reference signal for the second duration, if the beams that have been determined in the second candidate beam set include the first beam, feeding back to the second device the signal quality of the first reference signal obtained by the first device based on the first beam. For implementation of the fifth indication information, refer to the foregoing first indication information. Details are not described again in this embodiment of this application.

In an optional implementation, the foregoing step S502 in which the second device obtains the second reference signal from the first device and determines the second beam may be implemented as follows: The second device periodically obtains the second reference signal from the first device, and determines a fifth candidate beam set. An $i^{th}$ beam in the fifth candidate beam set is determined based on the second reference signal obtained for the $i^{th}$ time, i being a positive integer. The fifth candidate beam set includes the second beam.

Further, in the process of determining the fifth candidate beam set, the method further includes: when the second device has periodically obtained the second reference signal for a fourth duration, if beams that have been determined in the fifth candidate beam set do not include the second beam, sending sixth indication information to the first device, where the sixth indication information is used to indicate a remaining number of repetitions for the first device to send the second reference signal; or when the second device has periodically obtained the second reference signal for the fourth duration, if the beams that have been determined in the fifth candidate beam set include the second beam, indicating the first device to stop sending the second reference signal.

In addition, optionally, a combination of the first beam and the second beam trained based on the first set beam is the best, that is, it can be understood that this solution further includes the following implementation: The second device sends a fifth reference signal to the first device based on a second set beam, where the fifth reference signal is used by the first device to determine a fifth beam, a signal quality of the fifth reference signal obtained by the first device based on the fifth beam is the best, and a signal quality of the first reference signal obtained by the first device based on the fifth beam is less than that of the first reference signal obtained by the first device based on the first beam. The second set beam is any beam of the second device other than the first beam.

On the basis of Solution 1, Solution 2, or Solution 3, an embodiment of this application further provides a beam tracking solution. This solution can be applied to a scenario in which a device is moving during data transmission between the first device and the second device. The beam tracking solution is described in detail below by using the second device as a transmit end and the first device as a receive end. The solution mainly includes step (1) and step (2).

In step (1), the first device obtains a data signal from the second device based on the first beam, where the data signal is sent by the second device based on the second beam, and the data signal is associated with a sixth reference signal.

In step (2), the first device compares a signal quality of the sixth reference signal obtained by the first device based on the first beam with that of the first reference signal obtained by the first device based on the first beam, to obtain a second comparison result, where the second comparison result indicates that a variation between the signal quality of the sixth reference signal obtained by the first device based on the first beam and the signal quality of the first reference signal obtained by the first device based on the first beam exceeds a set threshold, and the second comparison result is used to update a beam used by the first device to receive the data signal or a beam used by the second device to send the data signal.

Optionally, the signal quality is indicated by SNR data. The signal quality of the sixth reference signal obtained by the first device based on the first beam is denoted as $R_2$, and the signal quality of the first reference signal obtained by the first device based on the first beam is denoted as $R_2'$. The second comparison result may be represented by a variation of $R_2$ relative to $R_2'$. For example, the second comparison result is expressed as $$\delta = \frac{|R_2' - R_2|}{R_2}.$$

In an optional implementation, the first device may update the second candidate beam set based on the second comparison result to obtain a third candidate beam set, where the third candidate beam set includes a sixth beam, and a signal quality of the data signal received by the first device through the sixth beam is greater than or equal to that of the data signal obtained by the first device through the first beam. Then the first device may obtain the data signal from the second device based on the sixth beam.

Figure 15A:
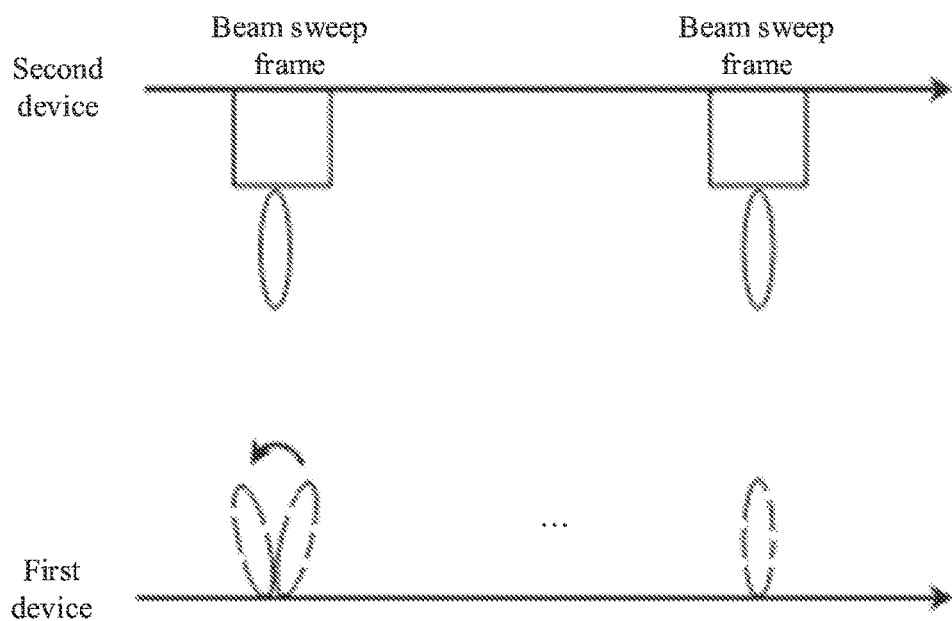
FIG. 15a is a schematic diagram of a beam tracking procedure on the side of a receive end according to an embodiment of this application.

Optionally, after determining the second comparison result, the first device may indicate the second device to suspend sending data, but to periodically send the sixth reference signal multiple times, so that the first device updates the second candidate beam set based on the periodically obtained sixth reference signal. For an update method, refer to a process in which the first device updates the first candidate beam set in the process B1. Details are not described again in this embodiment of this application. For example, FIG. 15a is a schematic diagram of a beam tracking procedure on the side of a receive end according to an embodiment of this application.

Optionally, the first device may update, based on the magnitude of the variation, beams included in the second candidate beam set. For example, an update is set to be performed only when the variation exceeds a set threshold. Different variations correspond to different numbers of beams that need to be updated in the second candidate beam set. Alternatively, if the second candidate beam set is formed by constructing a binary tree, a pruning algorithm may be used to adaptively select beam IDs to be updated, so as to update the tree structure. In this process, based on the foregoing variation, the first device may determine that a pruning depth is denoted as j, and that j=min{$\lfloor \alpha D^* \delta \rfloor$, D}, where D is a maximum depth of the tree, $0<\alpha \leq 1$ is a given hyperparameter. For example, when $\alpha=1$, it indicates that when $R_3$ is different from $R_3'$ by two times, that is, $\delta=1$, the entire tree needs to be pruned, and a tree needs to be reconstructed to measure all beams.

In another optional implementation, the first device feeds back the second comparison result to the second device, where the second comparison result is further used to determine q beams of the second device. The second device sends a seventh reference signal based on the q beams. The first device obtains the seventh reference signal based on the first beam, and determines a seventh beam, where a signal quality of the seventh reference signal that is sent by the second device based on the seventh beam and that is obtained by the first device is the best.

Figure 15B:
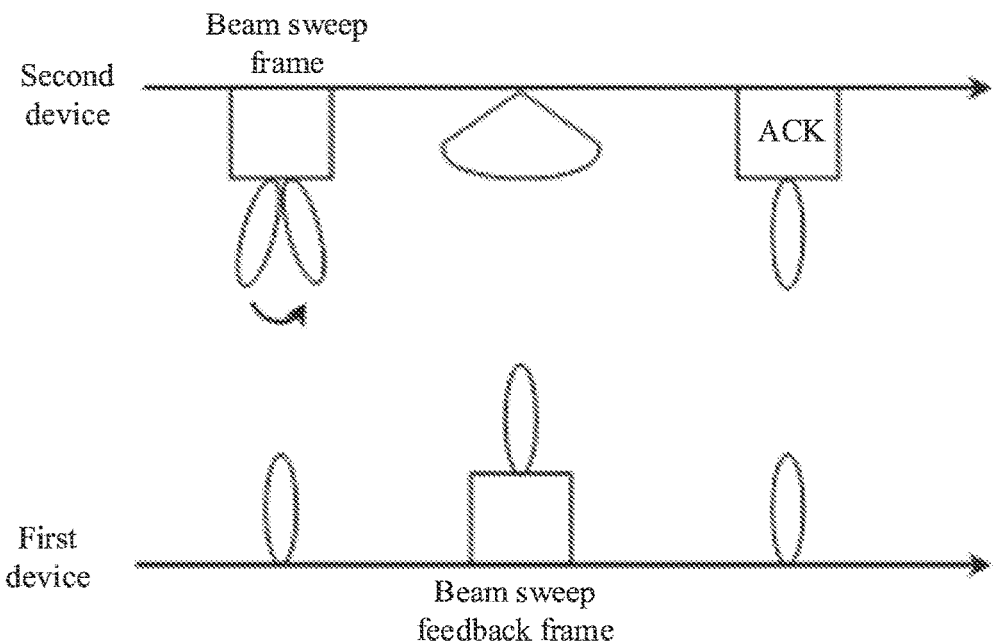
FIG. 15b is a schematic diagram of a beam tracking procedure on the side of a transmit end according to an embodiment of this application.

Then the first device sends seventh indication information to the second device, where the seventh indication information indicates the second device to send the data signal based on the seventh beam. For example, FIG. 15b is a schematic diagram of a beam tracking procedure on the side of a transmit end according to an embodiment of this application.

Optionally, the second device may determine, based on the second comparison result, beams that need to be updated in the candidate beam set, such as the foregoing fifth candidate beam set, constructed in the previous beam alignment process, and use the beams that need to be updated as the foregoing q beams. In the case that the candidate beam set is implemented by constructing a tree structure, the second device may also know the pruning depth of the tree structure based on the second comparison result, so as to determine the foregoing q beams based on the pruned beams or the pruning depth.

Specifically, if the second comparison result is represented by the variation described in step (1), the second device may update the beams included in the fifth candidate beam set based on the magnitude of the variation. For example, an update is set to be performed only when the variation exceeds a set threshold. Different variations correspond to different numbers of beams that need to be updated in the fifth candidate beam set. Alternatively, if the fifth candidate beam set is formed by constructing a binary tree, a pruning algorithm may be used to adaptively select beam IDs to be updated, so as to update the tree structure. In this process, based on the foregoing variation, the second device may determine that a pruning depth is denoted as j, and that $j=\min\{\lfloor \alpha D^*\delta \rfloor, D\}$, where D is a maximum depth of the tree, $0<\alpha \leq 1$ is a given hyperparameter. For example, when $\alpha=1$, it indicates that when $R_2$ is different from $R_2'$ by two times, that is, $\delta=1$, the entire tree needs to be pruned, and a tree needs to be reconstructed to measure all beams.

The foregoing implementation of the beam tracking phase can be analogous to finding extreme solutions on a curved surface using a hill-climbing algorithm. This greedy algorithm reduces traversal operations, greatly reduces the computational complexity, and quickly achieves beam tracking. In addition, it should be noted that the time computation of the foregoing beam tracking solution mainly depends on the switching of the transmit end and the receive end, or a time for switching beam transmission and reception and the number K of beam IDs in the candidate beam set that needs to be updated. A total time for performing transmit beam tracking at the transmit end is $O((\ )K)$. A total time for performing receive beam tracking at the receive end is $O((t+T)\sqrt{K\log K})$. K herein depends on a channel variation, that is, the foregoing second comparison result.

In terms of description, the beam combination building and update, the beam tracking, and the like in the foregoing solution 1 to solution 3 may be considered as a solution for adaptively adjusting a beam alignment strategy, and an algorithm for implementing these solutions may be defined, for example, an adaptive hierarchical optimistic optimization (adaptive hierarchical optimistic optimization, AHOO) algorithm.

In addition, an embodiment of this application further provides a beam management method. For details, refer to the description of the following solution 4.

Solution 4: It is assumed that the first device includes N beams and that the second device includes M beams. If it is predefined that any one of the N beams and any one of the M beams are selected as one beam combination, there are N*M beam combinations.

Optionally, a beam combination ID may further be defined to indicate a beam combination in the N*M beam combinations, and beam combination IDs of different beam combinations are different.

For example, the second device serves as a beam training initiator, and the first device serves as a beam training recipient. The second device may send multiple rounds of beam sweep frames to the first device by sequentially sending the beam sweep frames based on k beam combinations in each round. In each round, the first device may receive k beam sweep frames based on the k beam combinations corresponding to the round. Similar to the definition of the foregoing beam sweep frame, when the definition is applied to this solution, the beam ID in the beam sweep frame may be understood as a beam combination ID. Different beam sweep frames indicate different beam combination IDs.

Regarding the notation of the beam combination ID: A single number may be used to indicate a beam combination. For example, when a beam combination ID 1 is used to indicate that a beam 1 of the first device and a beam 1 of the second device form a beam combination, the second device may send, based on the beam 1 of the second device, a beam sweep frame carrying the beam combination ID 1, and the first device may receive, based on the beam 1 of the first device, the beam sweep frame carrying the beam combination ID 1, where different numbers indicate different beam combinations. Alternatively, two-dimensional coordinates may also be used to indicate a beam combination. For example, the two-dimensional coordinates (1, 1) are used to indicate that the beam 1 of the first device and the beam 1 of the second device form a beam combination. Different two-dimensional coordinates indicate different beam combinations. Alternatively, "×" is used to indicate a combination, and "1×1" is used to indicate that the beam 1 of the first device and the beam 1 of the second device form a beam combination. The N beam IDs of the first device and the M beam IDs of the second device may be mapped to $\Omega_0=\{[0, N-1]\times[0, M-1]\}$, where $[0, N-1]$ represents a value range of the beam IDs of the N beams of the first device, and $[0, M-1]$ represents a value range of the beam IDs of the M beams of the second device.

Optionally, the N*M beam combinations may be divided into k beam combination intervals at initialization, and a number of beam combinations included in each beam combination range is the same or similar.

For the $i^{th}$ round, when i is 1: the second device may select one beam combination from each of the k beam combination intervals, and send beam sweep frames based on the k beam combinations selected in this round. The first device determines, based on signal qualities of the received k beam sweep frames, a best beam combination in the k beam combinations corresponding to this round. Optionally, the first device may feed back a best beam combination interval of this round to the second device by sending a beam sweep feedback frame. A signal quality corresponding to the best beam combination interval is greater than that corresponding to the other beam combination intervals. A signal quality corresponding to a beam combination interval is related to a signal quality of a beam sweep frame transmitted by a selected beam combination in the interval. In this round, the best beam combination interval is an interval in which the best beam combination is located.

For example, with k being 4, a strategy for selecting four beam combinations in this round may be as follows: $\Omega_0=\{[0, N-1]\times[0, M-1]\}$ is equally divided into four intervals $\{\Omega_1^1, \Omega_1^2, \Omega_1^3, \Omega_1^4\}$. For example, an upper left interval is $$\Omega_1^1 = \left\{\left[0, \frac{N-1}{2}\right]\times\left[0, \frac{M-1}{2}\right]\right\},$$

(the subscript indicates the $i^{th}$ round, and the superscript indicates which interval in the k beam combination intervals). A beam combination corresponding to a center point of each interval may be selected, and a corresponding beam combination ID includes $$\mathcal{D}_1 = \left\{\left[\left\lceil\frac{N-1}{4}\right\rceil\times\left\lceil\frac{M-1}{4}\right\rceil\right], \left[\left\lceil\frac{N-1}{4}\right\rceil\times\left\lceil\frac{3(M-1)}{4}\right\rceil\right], \right.$$
$$\left.\left[\left\lceil\frac{3(N-1)}{4}\right\rceil\times\left\lceil\frac{M-1}{4}\right\rceil\right], \left[\left\lceil\frac{3(N-1)}{4}\right\rceil\times\left\lceil\frac{3(M-1)}{4}\right\rceil\right]\right\}.$$

Then the first device may include a beam combination ID corresponding to the center point of the best beam combination interval in a beam sweep feedback frame SSW-FB, to feed back the best beam combination interval to the second device.

For the $i^{th}$ round, when i is greater than 1, the second device may select k beam combinations from a best beam combination interval determined in the $(i-1)^{th}$ round, and send beam sweep frames based on the k beam combinations selected in this round. The first device may feed back a best beam combination interval of this round to the second device by sending a beam sweep feedback frame and based on signal qualities of the received k beam sweep frames and signal qualities of beam sweep frames transmitted by beam combinations in the first (i-1) rounds. A signal quality corresponding to the best beam combination interval is greater than that corresponding to the other beam combination intervals. A signal quality corresponding to a beam combination interval is related to a signal quality of a beam sweep frame transmitted by a selected beam combination in the interval. Optionally, the first device may further feed back the best beam combination interval of this round to the second device by sending a beam sweep feedback frame.

The strategy of selecting k beam combinations in this round needs to be discussed on a case-by-case basis: If i is 2, the best beam combination interval determined in the first round may be equally divided into four parts by referring to the selection method in the first round. Assuming that $\Omega_1^1$ is determined as the best beam interval in the first round, the set $\Omega_1^1$ may be divided into four smaller intervals $\{\Omega_2^1, \Omega_2^2, \Omega_2^3, \Omega_2^4\}$ in the second round. Then the selected k beam combinations may be beam combinations represented by the center points of the intervals in $\{\Omega_2^1, \Omega_2^2, \Omega_2^3, \Omega_2^4\}$.

In the case that i is greater than 2, the first device needs to select k beam combinations from the best beam combi-nation interval determined in the $(i-1)^{th}$ round based on the best beam combination interval determined in the $(i-1)^{th}$ round and the best beam combination in the optimal beam combination interval determined in the $(i-1)^{th}$ round. Specifically, with the foregoing best beam combination as the center point, four intervals around the best beam combination are determined, and the k beam combinations are selected from the four intervals.

By analogy, until the first device cannot select k beam combinations at a time, or the selected k beam combinations represent a same beam combination, it is determined that convergence is achieved. Then it is determined that the finally selected beam combination is the best beam combination.

Similarly, the selected beam combination in the foregoing process of the multiple rounds of beam combination training until the convergence may be recorded by constructing a tree structure. For example, when k is 4, a quadtree may be constructed, and each tree node except the root node represents the first selected beam combination, so as to facilitate the subsequent beam tracking. For example, pruning may be performed, and a beam combination that needs to be adjusted is adaptively selected, thereby reducing interference caused by channel noise to tracking. In addition, some signaling interaction and decision-making processes can be reduced, and the algorithm complexity can be reduced, so that beam tracking efficiency in massive MMO is higher, and performance is better.

Figure 16:
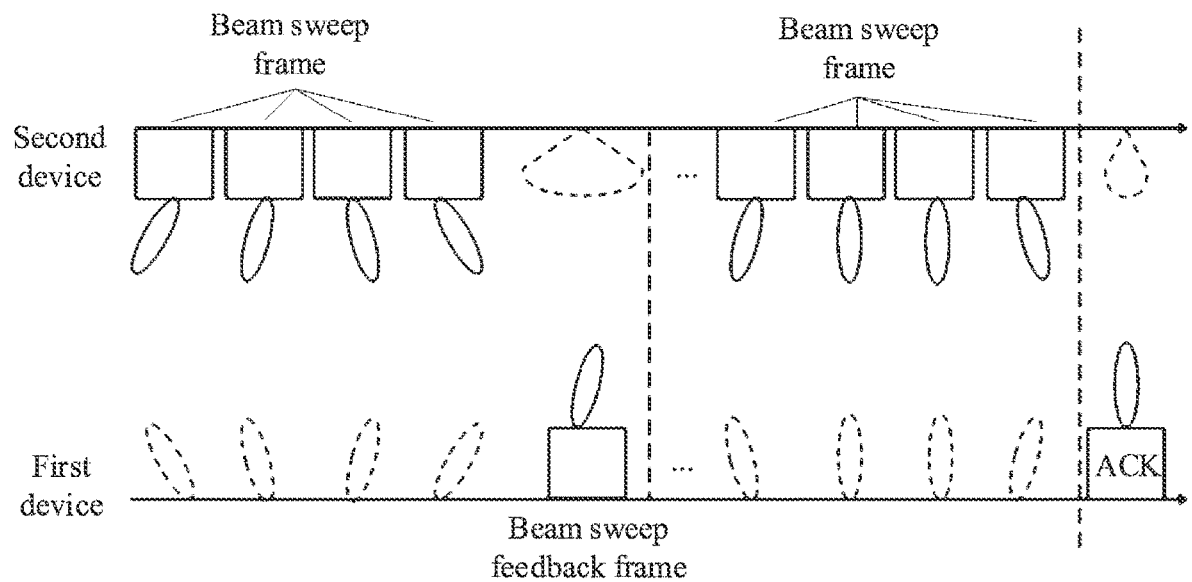
FIG. 16 is a schematic diagram 1 of a beam alignment procedure according to an embodiment of this application.

FIG. 16 is a schematic diagram of a beam alignment procedure according to an embodiment of this application. A process of determining a best beam combination in the foregoing solution 4 is shown with k being 4.

By setting narrow beam combinations, this solution 4 is suitable for requirements for beam alignment and beam tracking between narrow beam devices, and a global optimum can be obtained without multiple rounds of training. In addition, it should be noted that the time computation of this solution 4 mainly depends on a time T1 for switching beam combinations, a time T2 for switching the transmit end and the receive end, and a time for constructing a candidate beam set, for example, establishing a tree structure. It is assumed that a beam switching time is T and that T depends on hardware. A time for establishing a tree node is t, and t depends on the internal implementation of software. A total number of beams of a device is N. Then a total time of the beam combination build phase is $O((t+T1+T2)N\sqrt{2\log N})$.

Figure 17:
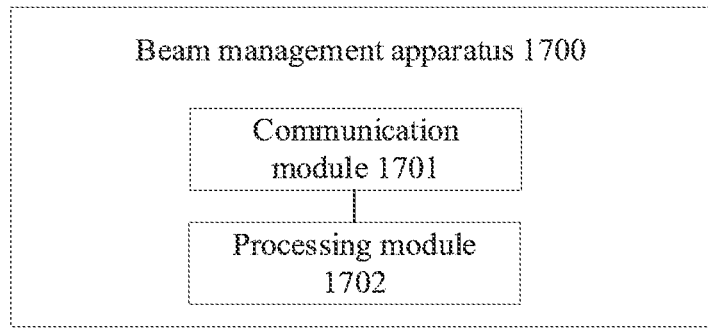
FIG. 17 is a block diagram of a structure of a beam management apparatus according to an embodiment of this application.

Based on the same concept, referring to FIG. 17, an embodiment of this application provides a beam management apparatus 1700. The apparatus 1700 includes a communication module 1701 and a processing module 1702. The communication apparatus 1700 may be a second device, or may be an apparatus that is applied to a second device and that can support the second device in performing a beam management method. Alternatively, the communication apparatus 1700 may be a first device, or may be an apparatus that is applied to a first device and that can support the first device in performing a beam management method.

The communication module may also be referred to as a transceiver module, a transceiver, a transceiver, a transceiver apparatus, or the like. The processing module may also be referred to as a processor, a processing board, a processing unit, a processing apparatus, or the like. Optionally, a component in the communication module that is configured to implement a receiving function may be considered as a receiving unit. It should be understood that the communication module is configured to perform a sending operation and a receiving operation on the second device side or the first device side in the foregoing method embodiments, and a component in the communication module that is configured to implement a sending function is considered as a sending unit. In other words, the communication module includes the receiving unit and the sending unit. When the apparatus 1700 is applied to the second device, the receiving unit included in the communication module 1701 of the apparatus 1700 is configured to perform a receiving operation on the second device side, for example, receive first information from the first device; and the sending unit included in the communication module 1701 of the apparatus 1700 is configured to perform a sending operation on the second device side, for example, send second information to the first device. When the apparatus 1700 is applied to the first device, the receiving unit included in the communication module 1701 of the apparatus 1700 is configured to perform a receiving operation on the first device side, for example, receive second information from the second device. The sending unit included in the communication module 1701 is configured to perform a sending operation on the first device side, for example, send first information to the second device. In addition, it should be noted that, if the apparatus is implemented by using a chip/chip circuit, the communication module may be an input/output circuit and/or a communication interface, and performs an input operation (corresponding to the foregoing receiving operation) and an output operation (corresponding to the foregoing sending operation). The processing module is an integrated processor, a microprocessor, or an integrated circuit.

An implementation in which the apparatus 1700 is applied to the first device is described in detail below. The apparatus 1700 includes a communication module 1701 and a processing module 1702.

The communication module 1701 is configured to obtain a first reference signal from a second device, where the first reference signal is sent by the second device based on a first set beam.

The processing module 1702 is configured to determine a first beam, where a signal quality of the first reference signal obtained by the first device based on the first beam is the best.

The communication module 1701 is further configured to send a second reference signal to the second device based on the first beam, where the second reference signal is used to determine a second beam of the second device, and a signal quality of the second reference signal obtained by the second device based on the second beam is the same as that of the first reference signal obtained by the first device based on the first beam.

In this embodiment of this application, first, one end is set to send a beam, to train a best receive beam of the other end; and then a best receive beam of the foregoing one end is trained based on the foregoing best receive beam, so as to quickly achieve beam alignment between the two ends. By using uplink and downlink consistency, the first device and the second device can perform data transmission through a beam combination consisting of the first beam and the second beam.

In an optional implementation, the communication module 1701 is further configured to: before obtaining the first reference signal from the second device, send a third reference signal to the second device based on a wide beam of the first device, where the third reference signal is used to determine the first set beam of the second device, and a signal quality of the third reference signal obtained by the second device based on the first set beam is the best.

In this embodiment of this application, the first set beam is a best receive beam trained based on a transmit wide beam, and the use of the first set beam as a basis for training the first beam makes performance of training the first beam and the second beam better and further improves accuracy of beam alignment.

In an optional implementation, the communication module 1701 is further configured to: before obtaining the first reference signal from the second device, send a third reference signal to the second device based on a third beam of the first device, where the third reference signal is used to determine the first set beam of the second device, and a signal quality of the third reference signal obtained by the second device based on the first set beam is the best.

In this embodiment of this application, the first set beam is a best receive beam trained based on a transmit beam (namely, the third beam) by the first device. The use of the first set beam as a basis for training the first beam may be applicable to a scenario in which the first device requires beam alignment to be within a specific beam range.

In an optional implementation, the communication module 1701 is further configured to: before obtaining the first reference signal from the second device, periodically obtain a fourth reference signal from the second device, and determine a first candidate beam set, where the fourth reference signal is sent by the second device based on a first initialization beam of the second device, and an $i^{th}$ beam in the first candidate beam set is determined based on the fourth reference signal received for the $i^{th}$ time, i being a positive integer; the first candidate beam set includes the third beam, and a signal quality of the fourth reference signal obtained by the first device based on the third beam is the best.

In this embodiment of this application, the first set beam is a best receive beam trained based on the third beam of the first device, but the third beam is trained based on the first initialization beam selected by the second device. The use of the first set beam as a basis for training the first beam may be applicable to a scenario in which the second device requires beam alignment to be within a specific beam range.

In an optional implementation, the communication module 1701 is further configured to: before obtaining the first reference signal from the second device, periodically obtain a fourth reference signal from the second device, and determine a first candidate beam set, where the fourth reference signal is sent by the second device based on a wide beam of the second device, and an $i^{th}$ beam in the first candidate beam set is determined based on the fourth reference signal received for the $i^{th}$ time, i being a positive integer; the first candidate beam set includes a third beam, and a signal quality of the fourth reference signal obtained by the first device based on the third beam is the best.

In an optional implementation, the processing module 1702 is further configured to: when the fourth reference signal has been periodically obtained for a first duration, if beams that have been determined in the first candidate beam set do not include the third beam, use the communication module 1701 to send first indication information to the second device, where the first indication information is used to indicate a remaining number of repetitions for the second device to send the fourth reference signal; or when the fourth reference signal has been periodically obtained for the first duration, if the beams that have been determined in the first candidate beam set include the third beam, use the communication module 1701 to feed back to the second device the signal quality of the fourth reference signal obtained by the first device based on the third beam.

The first device indicates the remaining number of transmissions of the reference signal to the second device based on the included beams in the process of constructing the candidate beam set and searching for beams, so that a number of reference signal transmissions by the second device can be reduced without searching for all the beams, that is, signaling overheads can be reduced, and a time for constructing the candidate beam set can be shortened, which helps to quickly achieve beam alignment.

In an optional implementation, the communication module 1701 is configured to obtain the first reference signal from the second device based on the third beam; the processing module 1702 is further configured to: compare a signal quality of the first reference signal obtained by the first device based on the third beam with that of the fourth reference signal obtained by the first device based on the third beam, to determine a first comparison result; and use the communication module 1701 to send second indication information to the second device based on the first comparison result, where the second indication information is used to indicate the second device to send the first reference signal p times, p being a positive integer; the communication module 1701 is further configured to receive the first reference signal sent by the second device p times; and the processing module 1702 is further configured to update the first candidate beam set to obtain a second candidate beam set, where the second candidate beam set includes the first beam, and the signal quality of the first reference signal obtained by the first device based on the first beam is greater than that of the first reference signal obtained by the first device based on the third beam.

In this embodiment of this application, updating and iterating the initially constructed candidate beam set is conducive to improving the accuracy and reliability of beam alignment.

In an optional implementation, the communication module 1701 is further configured to obtain a fifth reference signal sent by the second device based on a second set beam, where the second set beam is any beam of the second device other than the first beam; and the processing module 1702 is further configured to determine a fifth beam, where a signal quality of the fifth reference signal obtained by the first device based on the fifth beam is the best, and a signal quality of the first reference signal obtained by the first device based on the fifth beam is less than that of the first reference signal obtained by the first device based on the first beam.

In a data transmission process, a beam used for receiving or sending data is updated in a timely manner with reference to a change of channel information, for example, a variation of a reference signal, to implement beam tracking. This is applicable to a scenario in which a device is moving, and can effectively ensure normal communication between devices.

In an optional implementation, the communication module 1701 is further configured to obtain a data signal from the second device based on the first beam, where the data signal is sent by the second device based on the second beam, and the data signal is associated with a sixth reference signal; and the processing module 1702 is further configured to compare a signal quality of the sixth reference signal obtained by the first device based on the first beam with that of the first reference signal obtained by the first device based on the first beam, to obtain a second comparison result, where the second comparison result is used to update a beam used by the first device to receive the data signal or a beam used by the second device to send the data signal.

In this embodiment of this application, when the best beam combination is trained in multiple rounds based on different set beams, the best round is selected as a beam alignment training result (the first beam and the second beam), which is conducive to improving the accuracy and reliability of beam alignment.

An implementation in which the apparatus 1700 is applied to the second device is described in detail below. The apparatus 1200 includes a communication module 1701 and a processing module 1702.

The communication module 1701 is configured to send a first reference signal to a first device based on a first set beam, where the first reference signal is used to determine a first beam of the first device, and a signal quality of the first reference signal obtained by the first device based on the first beam is the best.

The communication module 1701 is further configured to obtain a second reference signal from the first device, where the second reference signal is sent by the first device based on the first beam.

The processing module 1702 is configured to determine a second beam, where a signal quality of the second reference signal obtained by the second device based on the second beam is the same as that of the first reference signal obtained by the first device based on the first beam.

In this embodiment of this application, first, one end is set to send a beam, to train a best receive beam of the other end; and then a best receive beam of the foregoing one end is trained based on the foregoing best receive beam, so as to quickly achieve beam alignment between the two ends. By using uplink and downlink consistency, the first device and the second device can perform data transmission through a beam combination consisting of the first beam and the second beam.

In an optional implementation, the communication module 1701 is further configured to, before sending the first reference signal to the second device based on the first set beam, obtain a third reference signal from the first device, where the third reference signal is sent by the first device based on a wide beam of the first device; and the processing module 1702 is further configured to determine the first set beam, where a signal quality of the third reference signal obtained by the second device based on the first set beam is the best.

In an optional implementation, before the sending a first reference signal to a second device based on a first set beam, the method further includes: obtaining a third reference signal from the first device, and determining the first set beam, where the third reference signal is sent by the first device based on a third beam of the first device, and a signal quality of the third reference signal obtained by the second device based on the first set beam is the best.

In this embodiment of this application, the first set beam is a best receive beam trained based on a transmit wide beam, and the use of the first set beam as a basis for training the first beam makes performance of training the first beam and the second beam better and further improves accuracy of beam alignment.

In an optional implementation, the communication module 1701 is configured to periodically obtain the third reference signal from the first device; and the processing module 1702 is configured to determine a fourth candidate beam set, where an it beam in the fourth candidate beam set is determined based on the third reference signal obtained for the $i^{th}$ time, i being a positive integer; the fourth candidate beam set includes the first set beam.

In this embodiment of this application, the first set beam is a best receive beam trained based on a transmit beam (namely, the third beam) by the first device. The use of the first set beam as a basis for training the first beam may be applicable to a scenario in which the first device requires beam alignment to be within a specific beam range.

In an optional implementation, the processing module 1702 is further configured to: when the third reference signal has been periodically obtained for a third duration, if beams that have been determined in the fourth candidate beam set do not include the first set beam, use the communication module 1701 to send third indication information to the first device, where the third indication information is used to indicate a remaining number of repetitions for the first device to send the third reference signal; or when the third reference signal has been periodically obtained for the third duration, if the beams that have been determined in the fourth candidate beam set include the first set beam, use the communication module 1701 to indicate the first device to stop sending the third reference signal.

In an optional implementation, the communication module 1701 is further configured to obtain the second reference signal from the first device based on the first set beam; the processing module 1702 is further configured to: compare a signal quality of the second reference signal obtained by the second device based on the first set beam with that of the first reference signal obtained by the first device based on the first beam, to determine a third comparison result; and use the communication module 1701 to send fourth indication information to the first device based on the third comparison result, where the fourth indication information is used to indicate the first device to send the second reference signal p times, p being a positive integer; and the processing module 1702 is further configured to use the communication module 1701 to obtain the second reference signal sent by the second device p times, and update the fourth candidate beam set to obtain a fifth candidate beam set, where the fifth candidate beam set includes the second beam.

The second device indicates the remaining number of transmissions of the reference signal to the first device based on the included beams in the process of constructing the candidate beam set and searching for beams, so that a number of reference signal transmissions by the first device can be reduced without searching for all the beams, that is, signaling overheads can be reduced, and a time for constructing the candidate beam set can be shortened, which helps to quickly achieve beam alignment.

In an optional implementation, the communication module 1701 is further configured to, before obtaining the second reference signal sent by the first device based on the first beam, send a fifth reference signal to the first device based on a second set beam, where the fifth reference signal is used by the first device to determine a fifth beam, a signal quality of the fifth reference signal obtained by the first device based on the fifth beam is the best, and a signal quality of the first reference signal obtained by the first device based on the fifth beam is less than that of the first reference signal obtained by the first device based on the first beam; the second set beam is any beam of the second device other than the first beam.

In this embodiment of this application, when the best beam combination is trained in multiple rounds based on different set beams, the best round is selected as a beam alignment training result (the first beam and the second beam), which is conducive to improving the accuracy and reliability of beam alignment.

Figure 18:
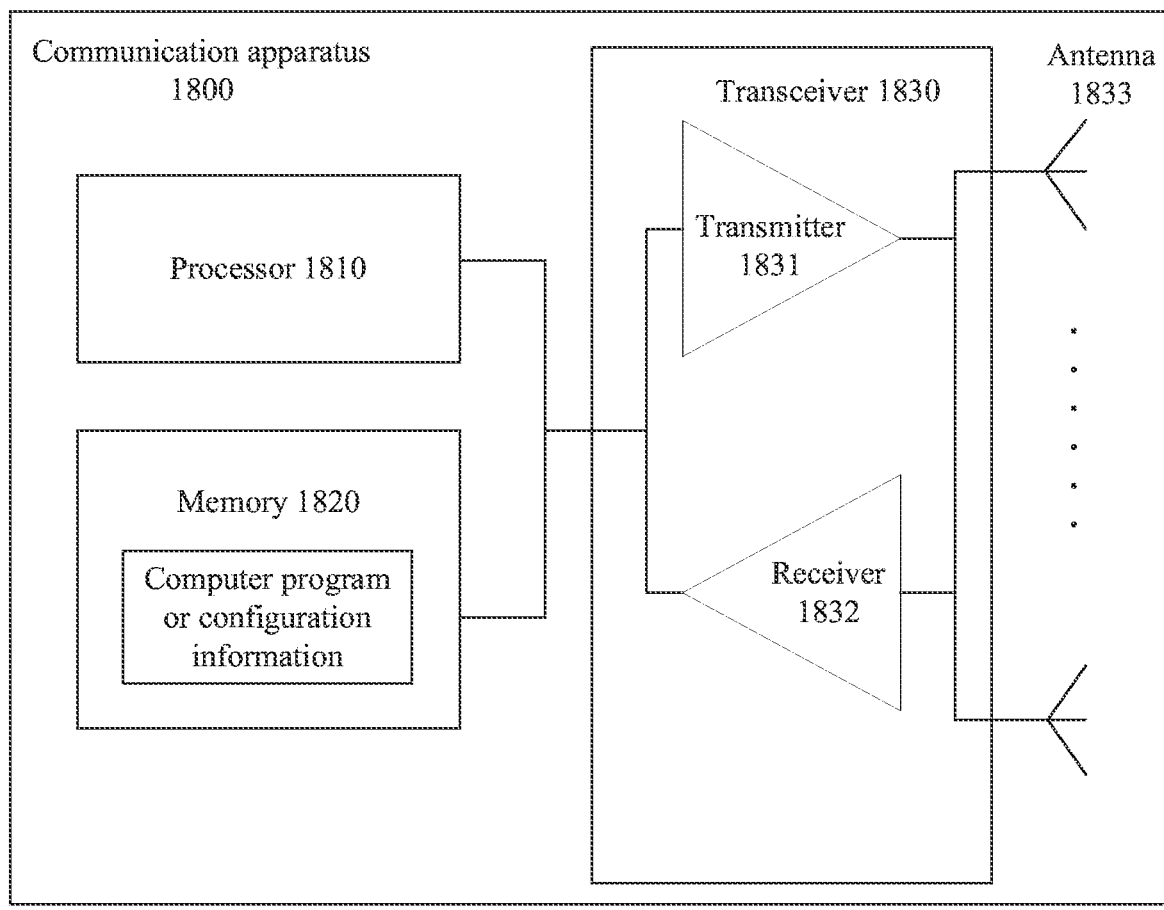
FIG. 18 is a schematic diagram of a structure of a communication apparatus according to an embodiment of this application.

Based on the same concept, as shown in FIG. 18, an embodiment of this application provides a communication apparatus 1800. The communication apparatus 1800 may be a chip or a chip system. Optionally, in this embodiment of this application, the chip system may include a chip, or may include the chip and other discrete devices.

The communication apparatus 1800 may include at least one processor 1810. The processor 1810 is coupled to a memory. Optionally, the memory may be located inside the apparatus, or may be located outside the apparatus. For example, the communication apparatus 1800 may further include at least one memory 1820. The memory 1820 stores a computer program, configuration information, a computer program or instructions, and/or data necessary for implementing any one of the foregoing embodiments. The processor 1810 may execute the computer program stored in the memory 1820, to complete the method in any one of the foregoing embodiments.

The coupling in this embodiment of this application is indirect coupling or a communication connection between apparatuses, units, or modules for information exchange between the apparatuses, the units, or the modules, and may be in electrical, mechanical, or other forms. The processor 1810 may cooperate with the memory 1820. In this embodiment of this application, a specific connection medium between the transceiver 1830, the processor 1810, and the memory 1820 is not limited.

The communication apparatus 1800 may further include a transceiver 1830, and the communication apparatus 1800 may exchange information with another device via the transceiver 1830. The transceiver 1830 may be a circuit, a bus, a transceiver, or any other apparatus that can be configured to exchange information, or may be referred to as a signal transceiver unit. As shown in FIG. 18, the transceiver 1830 includes a transmitter 1831, a receiver 1832, and an antenna 1833. In addition, when the communication apparatus 1800 is a chip-type apparatus or circuit, the transceiver in the apparatus 1800 may also be an input/output circuit and/or a communication interface, and may input data (or referred to as receiving data) and output data (or referred to as sending data). The processor is an integrated processor, a microprocessor, or an integrated circuit, and the processor may determine output data based on the input data.

In a possible implementation, the communication apparatus 1800 may be applied to a second device. Specifically, the communication apparatus 1800 may be the second device, or may be an apparatus that can support the second device in implementing a function of the second device in any one of the foregoing embodiments. The memory 1820 stores a necessary computer program, a computer program or instructions, and/or data for implementing the function of the second device in any one of the foregoing embodiments. The processor 1810 may execute the computer program stored in the memory 1820, to complete the method performed by the second device in any one of the foregoing embodiments. Applied to the second device, the transmitter 1831 in the communication apparatus 1800 may be configured to send transmission control configuration information to the first device via the antenna 1833, and the receiver 1832 may be configured to receive, via the antenna 1833, the transmission information sent by the first device.

In another possible implementation, the communication apparatus 1800 may be applied to a first device. Specifically, the communication apparatus 1800 may be the first device, or may be an apparatus that can support the first device in implementing a function of the first device in any one of the foregoing embodiments. The memory 1820 stores a necessary computer program, a computer program or instructions, and/or data for implementing the function of the first device in any one of the foregoing embodiments. The processor 1810 may execute the computer program stored in the memory 1820, to complete the method performed by the first device in any one of the foregoing embodiments. Applied to the first device, the receiver 1832 in the communication apparatus 1800 may be configured to receive, via the antenna 1833, transmission control configuration information sent by the second device, and the transmitter 1831 may be configured to send the transmission information to the second device via the antenna 1833.

The communication apparatus 1800 provided in this embodiment may be applied to the second device to complete the method performed by the second device, or may be applied to the first device to complete the method performed by the first device. Therefore, for technical effects that can be achieved by the apparatus, refer to the foregoing method embodiments. Details are not described herein again.

In the embodiment of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor, or may be any conventional processor or the like. The steps of the method disclosed with reference to embodiments of this application may be directly performed by a hardware processor, or may be performed by using a combination of hardware in the processor and a software module.

In embodiments of this application, the memory may be a nonvolatile memory, for example, a hard disk drive (hard disk drive, HDD) or a solid-state drive (solid-state drive, SSD), or may be a volatile memory (volatile memory) such as a random access memory (random-access memory, RAM). The memory may alternatively be any other medium that can be configured to carry or store expected program code in a form of instructions or a data structure and that can be accessed by a computer. This is not limited thereto. The memory in the embodiment of this application may alternatively be a circuit or any other apparatus that can implement a storage function, and is configured to store the computer program, the program instructions, and/or the data.

Figure 19:
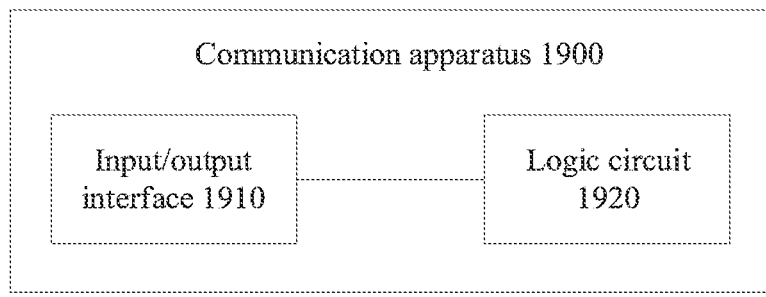
FIG. 19 is a schematic diagram of a structure of another communication apparatus according to an embodiment of this application.

Based on the foregoing embodiments, referring to FIG. 19, an embodiment of this application further provides another communication apparatus 1900. The apparatus 1900 includes: an input/output interface 1910 and a logic circuit 1920. The input/output interface 1910 is configured to receive code instructions and transmit the code instructions to the logic circuit 1920. The logic circuit 1920 is configured to execute the code instructions to perform the method performed by the second device or the method performed by the first device in any one of the foregoing embodiments.

The communication apparatus 1900 may be applied to the first device, to perform the method performed by the first device. The input/output interface is configured to obtain a first reference signal from a second device, where the first reference signal is sent by the second device based on a first set beam; and the logic circuit is configured to determine a first beam, where a signal quality of the first reference signal obtained by the first device based on the first beam is the best; and the input/output interface is further configured to send a second reference signal to the second device based on the first beam, where the second reference signal is used to determine a second beam of the second device, and a signal quality of the second reference signal obtained by the second device based on the second beam is the same as that of the first reference signal obtained by the first device based on the first beam.

The communication apparatus 1900 may be applied to the second device, to perform the method performed by the second device. The input/output interface is configured to transmit a first reference signal to a first device based on a first set beam, where the first reference signal is used to determine a first beam of the first device, and a signal quality of the first reference signal obtained by the first device based on the first beam is the best; the input/output interface is further configured to obtain a second reference signal from the first device, where the second reference signal is sent by the first device based on the first beam; and the logic circuit is configured to determine a second beam, where a signal quality of the second reference signal obtained by the second device based on the second beam is the same as that of the first reference signal obtained by the first device based on the first beam.

The communication apparatus 1900 provided in this embodiment may be applied to the second device to perform the method performed by the second device, or may be applied to the first device to perform the method performed by the first device. Therefore, for technical effects that can be achieved by the apparatus, refer to the foregoing method embodiments. Details are not described herein again.

Based on the foregoing embodiments, an embodiment of this application further provides a communication system. The communication system includes at least one communication apparatus applied to a second device and at least one communication apparatus applied to a first device. Therefore, for technical effects that can be achieved by the system, refer to the foregoing method embodiments. Details are not described herein again.

Based on the foregoing embodiments, an embodiment of this application further provides a computer-readable storage medium. The computer-readable storage medium stores a computer program or instructions. When the instructions are executed, the method performed by the second device in any one of the foregoing embodiments or the method performed by the first device is implemented. The computer-readable storage medium may include any medium that can store program code, such as a USB flash drive, a removable hard disk, a read-only memory, a random access memory, a magnetic disk, or an optical disc.

To implement the functions of the communication apparatuses in FIG. 18 and FIG. 19, an embodiment of this application further provides a chip, including a processor, configured to support the communication apparatus in implementing the functions related to the second device or the first device in the foregoing method embodiments. In a possible design, the chip is connected to a memory or the chip includes the memory, and the memory is configured to store a computer program or instructions and data that are necessary for the communication apparatus.

A person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that each procedure and/or block in the flowcharts and/or block diagrams, and combinations of the procedures and/or blocks in the flowcharts and/or block diagrams may be implemented by a computer program or instructions. The computer program or instructions may be provided to a processor of a general-purpose computer, a special-purpose computer, an embedded processor, or another programmable data processing device to generate a machine, such that the instructions executed by the processor of the computer or another programmable data processing device generate an apparatus for implementing a specific function in one or more procedures in the flowcharts and/or one or more blocks in the block diagrams.

The computer program or instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program or instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It is clear that a person skilled in the art can make various modifications and variations to embodiments of this application without departing from the scope of embodiments of this application. In this way, if these changes and variations to the embodiments of this application fall within the scope of the claims of this application and equivalent technologies thereof, this application is also intended to include these changes and variations.

What is claimed is:

1. A beam management method, applied to a first device, the method comprising:
   obtaining a first reference signals that is sent by a second device based on a first set beam;
   determining a first beam based on a signal quality of the reference signal obtained by the first device, wherein the signal quality of the first reference signal obtained by the first device based on the first beam is the best; and
   sending, to the second device based on the first beam, a second reference signal for determining a second beam of the second device, wherein a signal quality of the second reference signal obtained by the second device based on the second beam is the same as that of the first reference signal obtained by the first device based on the first beam or a difference between the signal quality of the first reference signal obtained by the first device based on the first beam and the signal quality of the second reference signal obtained by the second device based on the second beam is less than a threshold.

2. The method of claim 1, before the obtaining the first reference signal, the method further comprising:
   sending a third reference signal to the second device based on a wide beam of the first device, wherein the third reference signal is used to determine the first set beam of the second device, and a signal quality of the third reference signal obtained by the second device based on the first set beam is the best.

3. The method of claim 1, before the obtaining the first reference signal, the method further comprising:
   periodically obtaining a fourth reference signal that is sent by the second device based on a wide beam of the second device, and
   determining, based on the fourth reference signal periodically obtained, a first candidate beam set including a third beam, wherein an $i^{th}$ beam in the first candidate beam set is determined based on the fourth reference signal received for the $i^{th}$ time, i being a positive integer, and a signal quality of the fourth reference signal obtained by the first device based on the third beam is the best.

4. The method of claim 3, the method further comprising:
   when the fourth reference signal has been periodically obtained for a first duration, and beams that have been determined in the first candidate beam set do not include the third beam, sending first indication information to the second device to indicate a remaining number of repetitions for the second device to send the fourth reference signal; or
   when the fourth reference signal has been periodically obtained for the first duration, and the beams that have been determined in the first candidate beam set include the third beam, feeding back to the second device the fourth signal quality of the fourth reference signal obtained by the first device based on the third beam.

5. The method of claim 3, wherein the determining the first beam comprises:
   comparing a signal quality of a first reference signal obtained by the first device based on the third beam with that of the fourth reference signal obtained by the first device based on the third beam, to determine a first comparison result;
   sending second indication information to the second device based on the first comparison result, wherein the second indication information is used to indicate the second device to send the first reference signal p times, p being a positive integer;
   receiving the first reference signal sent by the second device p times; and
   updating the first candidate beam set to obtain a second candidate beam set including the first beam, wherein the first signal quality of the first reference signal obtained by the first device based on the first beam is greater than the signal quality of the first reference signal obtained by the first device based on the third beam.

6. The method of claim 1, the method further comprising:
   obtaining a fifth reference signal sent by the second device based on a second set beam; and
   determining a fifth beam based on the fifth reference signal, wherein a signal quality of the fifth reference signal obtained by the first device based on the fifth beam is the best, and a signal quality of the first reference signal obtained by the first device based on the fifth beam is less than that of the first reference signal obtained by the first device based on the first beam, the second set beam is any beam of the second device other than the first beam.

7. The method of claim 1, the method further comprising:
obtaining a data signal from the second device based on the first beam, wherein the data signal is sent by the second device based on the second beam, and the data signal is associated with a sixth reference signal; and
comparing a signal quality of the sixth reference signal obtained by the first device based on the first beam with the first signal quality of the first reference signal obtained by the first device based on the first beam, to obtain a second comparison result, wherein the second comparison result is used to update a beam used by the first device to receive the data signal or a beam used by the second device to send the data signal.

8. A beam management method, applied to a second device, the method comprising:
sending a first reference signal to a first device based on a first set beam, wherein the first reference signal is used to determine a first beam of the first device, and a signal quality of the first reference signal obtained by the first device based on the first beam is the best;
obtaining a second reference signal from the first device, wherein the second reference signal is sent by the first device based on the first beam; and
determining a second beam based on the second reference, wherein a signal quality of the second reference signal obtained by the second device based on the second beam is the same as that of the first reference signal obtained by the first device based on the first beam or a difference between the signal quality of the first reference signal obtained by the first device based on the first beam and the signal quality of the second reference signal obtained by the second device based on the second beam is less than a threshold.

9. The method of claim 8, before the sending the first reference signal, the method further comprising:
obtaining a third reference signal from the first device, wherein the third reference signal is sent by the first device based on a wide beam of the first device; and
determining the first set beam, wherein a signal quality of the third reference signal obtained by the second device based on the first set beam is the best.

10. The method of claim 9, wherein the third reference signal is periodically obtained from the first device, and the determining the first set beam comprises:
determining a fourth candidate beam set based on the third reference signal periodically obtained, wherein an $i^{th}$ beam in the fourth candidate beam set is determined based on the third reference signal obtained for the $i^{th}$ time, i being a positive integer; the fourth candidate beam set comprises the first set beam.

11. The method of claim 10, the method further comprising:
when the third reference signal has been periodically obtained for a third duration, and beams that have been determined in the fourth candidate beam set do not comprise the first set beam, sending third indication information to the first device, wherein the third indication information is used to indicate a remaining number of repetitions for the first device to send the third reference signal; or
when the third reference signal has been periodically obtained for the third duration, and the beams that have been determined in the fourth candidate beam set comprise the first set beam, indicating the first device to stop sending the third reference signal.

12. The method of claim 10, wherein the second reference signal is obtained from the first device based on the first set beam, and the determining the second beam comprises:
comparing a signal quality of the second reference signal obtained by the second device based on the first set beam with that of the first reference signal obtained by the first device based on the first beam, to determine a third comparison result;
sending fourth indication information to the first device based on the third comparison result, wherein the fourth indication information is used to indicate the first device to send the second reference signal p times, p being a positive integer;
obtaining the second reference signal sent by the second device p times; and
updating the fourth candidate beam set to obtain a fifth candidate beam set including the second beam.

13. The method of claim 8, before the obtaining the second reference signal sent by the first device based on the first beam, the method further comprising:
sending a fifth reference signal to the first device based on a second set beam, wherein the fifth reference signal is used by the first device to determine a fifth beam, a signal quality of the fifth reference signal obtained by the first device based on the fifth beam is the best, and a signal quality of the first reference signal obtained by the first device based on the fifth beam is less than that of the first reference signal obtained by the first device based on the first beam; the second set beam is any beam of the second device other than the first beam.

14. A communication apparatus, comprising:
a non-transitory memory storing a computer program or instructions, and
a processor coupled to the non-transitory memory and configured to execute the computer program or the instructions, to cause the communication apparatus to perform:
obtaining a first reference signal that is sent by a second device based on a first set beam;
determining a first beam based on a signal quality of the reference signal obtained by a first device, wherein the signal quality of the first reference signal obtained by the first device based on the first beam is the best; and
sending, to the second device based on the first beam, a second reference signal for determining a second beam of the second device, wherein a signal quality of the second reference signal obtained by the second device based on the second beam is the same as that of the first reference signal obtained by the first device based on the first beam or a difference between the signal quality of the first reference signal obtained by the first device based on the first beam and the signal quality of the second reference signal obtained by the second device based on the second beam is less than a threshold.

15. The communication apparatus of claim 14, wherein before obtaining the first reference signal, the processor is further configured to execute the computer program or the instructions, to cause the communication apparatus to perform:
periodically obtaining a fourth reference signal that is sent by the second device based on a wide beam of the second device, and
determining, based on the fourth reference signal periodically obtained, a first candidate beam set including a third beam, wherein an $i^{th}$ beam in the first candidate beam set is determined based on the fourth reference signal received for the $i^{th}$ time, i being a positive integer, and a signal quality of the fourth reference signal obtained by the first device based on the third beam is the best.

16. The communication apparatus of claim 15, wherein the processor is further configured to execute the computer program or the instructions, to cause the communication apparatus to perform:
   when the fourth reference signal has been periodically obtained for a first duration, and beams that have been determined in the first candidate beam set do not include the third beam, sending first indication information to the second device to indicate a remaining number of repetitions for the second device to send the fourth reference signal; or
   when the fourth reference signal has been periodically obtained for the first duration, and the beams that have been determined in the first candidate beam set include the third beam, feeding back to the second device the fourth signal quality of the fourth reference signal obtained by the first device based on the third beam.

17. The communication apparatus of claim 15, wherein the determining the first beam comprises:
   comparing a signal quality of a first reference signal obtained by the first device based on the third beam with that of the fourth reference signal obtained by the first device based on the third beam, to determine a first comparison result;
   sending second indication information to the second device based on the first comparison result, wherein the second indication information is used to indicate the second device to send the first reference signal p times, p being a positive integer;
   receiving the first reference signal sent by the second device p times; and
   updating the first candidate beam set to obtain a second candidate beam set including the first beam, wherein the first signal quality of the first reference signal obtained by the first device based on the first beam is greater than the signal quality of the first reference signal obtained by the first device based on the third beam.

18. A communication apparatus, comprising:
   a non-transitory memory storing a computer program or instructions, and
   a processor coupled to the non-transitory memory and configured to execute the computer program or the instructions, to cause the communication apparatus to perform:
   sending a first reference signal from a second device to a first device based on a first set beam, wherein the first reference signal is used to determine a first beam of the first device, and a signal quality of the first reference signal obtained by the first device based on the first beam is the best;
   obtaining a second reference signal from the first device, wherein the second reference signal is sent by the first device based on the first beam; and
   determining a second beam based on the second reference, wherein a signal quality of the second reference signal obtained by the second device based on the second beam is the same as that of the first reference signal obtained by the first device based on the first beam or a difference between the signal quality of the first reference signal obtained by the first device based on the first beam and the signal quality of the second reference signal obtained by the second device based on the second beam is less than a threshold.

19. The communication apparatus of claim 18, wherein the processor is further configured to execute the computer program or the instructions, to cause the communication apparatus to perform:
   determining a fourth candidate beam set based on a third reference signal periodically obtained from the first device;
   when the third reference signal has been periodically obtained for a third duration, and beams that have been determined in the fourth candidate beam set do not comprise the first set beam, sending third indication information to the first device, wherein the third indication information is used to indicate a remaining number of repetitions for the first device to send the third reference signal.

20. The communication apparatus of claim 18, wherein the second reference signal is obtained from the first device based on the first set beam, and the determining the second beam comprises:
   comparing a signal quality of the second reference signal obtained by the second device based on the first set beam with that of the first reference signal obtained by the first device based on the first beam, to determine a comparison result;
   sending indication information to the first device based on the comparison result, wherein the indication information is used to indicate the first device to send the second reference signal p times, p being a positive integer;
   obtaining the second reference signal sent by the second device p times; and
   add the second beam to a candidate beam set.

* * * * *